(12) United States Patent
Göransson et al.

(10) Patent No.: US 8,855,223 B2
(45) Date of Patent: Oct. 7, 2014

(54) HS-SCCH ORDERS FOR CQI MODE SELECTION

(75) Inventors: Bo Göransson, Sollentuna (SE); Johan Bergman, Stockholm (SE); Dirk Gerstenberger, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 416 days.

(21) Appl. No.: 12/864,190

(22) PCT Filed: Jan. 23, 2009

(86) PCT No.: PCT/SE2009/050069
§ 371 (c)(1),
(2), (4) Date: Jul. 22, 2010

(87) PCT Pub. No.: WO2009/093975
PCT Pub. Date: Jul. 30, 2009

(65) Prior Publication Data
US 2010/0322333 A1 Dec. 23, 2010

Related U.S. Application Data

(60) Provisional application No. 61/023,346, filed on Jan. 24, 2008.

(51) Int. Cl.
*H04K 1/10* (2006.01)
*H04L 27/28* (2006.01)
*H04L 1/00* (2006.01)

(52) U.S. Cl.
CPC ............ *H04L 1/0023* (2013.01); *H04L 1/0027* (2013.01)
USPC ........... 375/260; 375/346; 375/349; 375/285; 455/424; 455/425; 455/423; 455/500; 455/501

(58) Field of Classification Search
CPC .............. H04L 27/2647; H04L 5/0007; H04L 27/2657; H04L 27/2662; H04L 5/0048; H04L 25/03343; H04L 25/497; H04L 25/03057; H04L 1/20; H04L 1/06; H04L 25/0204; H04B 3/32; H04B 3/23; H04B 1/1027; H04B 1/123; H04B 1/1036; H04B 7/002; H04B 1/109; H04B 17/0042; H04B 7/0413; H04B 15/00; H04B 17/0057; H04W 24/00; H04W 24/08; H04W 88/08; H04W 24/02; H04W 16/28; H04W 88/02; H04W 16/14; H04W 72/082
USPC .......... 375/260, 346, 349, 285; 455/424, 425, 455/423, 500, 501
See application file for complete search history.

(56) References Cited

U.S. PATENT DOCUMENTS

2004/0266472 A1 12/2004 Ben Rached et al.
2005/0007971 A1 1/2005 Jeong et al.
(Continued)

FOREIGN PATENT DOCUMENTS

EP 1643661 A2 4/2006
WO 2004/086712 A2 10/2004

OTHER PUBLICATIONS

3rd Generation Partnership Project. "CQI Reporting when MIMO and CPC are Both Configured." 3GPP TSG RAN WG1 meeting #49, Tdoc R1-072388, Kobe, Japan, May 7-11, 2007.
(Continued)

*Primary Examiner* — Phuong Phu
(74) *Attorney, Agent, or Firm* — Coats & Bennett, PLLC

(57) ABSTRACT

A network node (28) communicates over a radio interface (32) with a wireless terminal (30). Both the network node (28) and the wireless terminal (30) have multiple-input multiple-output (MIMO) capabilities. A MIMO-related order (90) is generated for inclusion in control signaling on a high speed downlink shared channel from the network node (28) to the wireless terminal (30). The MIMO-related order (90) is configured to modify channel quality indication (CQI) communications between the wireless terminal (30) and the base station (28) in view of MIMO capabilities of the wireless terminal (30). The method further comprises providing a channel quality indication (CQI) report (92) the wireless terminal (30) to the base station (28) in accordance with the order.

47 Claims, 14 Drawing Sheets

(56) References Cited

U.S. PATENT DOCUMENTS

| | | |
|---|---|---|
| 2005/0111395 A1 | 5/2005 | Hwang et al. |
| 2005/0153715 A1 | 7/2005 | Hwang et al. |
| 2005/0249159 A1 | 11/2005 | Abraham et al. |
| 2005/0270978 A1 | 12/2005 | Haines |
| 2006/0046662 A1 | 3/2006 | Moulsley et al. |
| 2006/0068712 A1 | 3/2006 | Kroboth et al. |
| 2006/0198340 A1 | 9/2006 | Murata et al. |
| 2008/0037501 A1 | 2/2008 | Ali et al. |
| 2008/0069031 A1 | 3/2008 | Zhang et al. |
| 2009/0033524 A1* | 2/2009 | Tiirola et al. .................. 341/51 |
| 2010/0118784 A1 | 5/2010 | Goransson et al. |

OTHER PUBLICATIONS

3rd Generation Partnership Project. "CQI Feedback Control and Content in E-UTRA." 3GPP RSG-RAN WG1 Meeting #49, R1-072077, Kobe, Japan, May 7-11, 2007.

3rd Generation Partnershp Project. "Uplink Overhead for CQI and MIMO Feedback in E-UTRA." TSG RAN WG1 meeting #48bis, R1-071418, St. Julian, Malta, Mar. 26-30, 2007.

3rd Generation Partnership Project. "DL/UL Signaling Channel Supporting DL Adaptive MIMO." 3GPP TSG-RAN WG1#48, R1-070700, St. Louis, USA, Feb. 12-16, 2007.

* cited by examiner

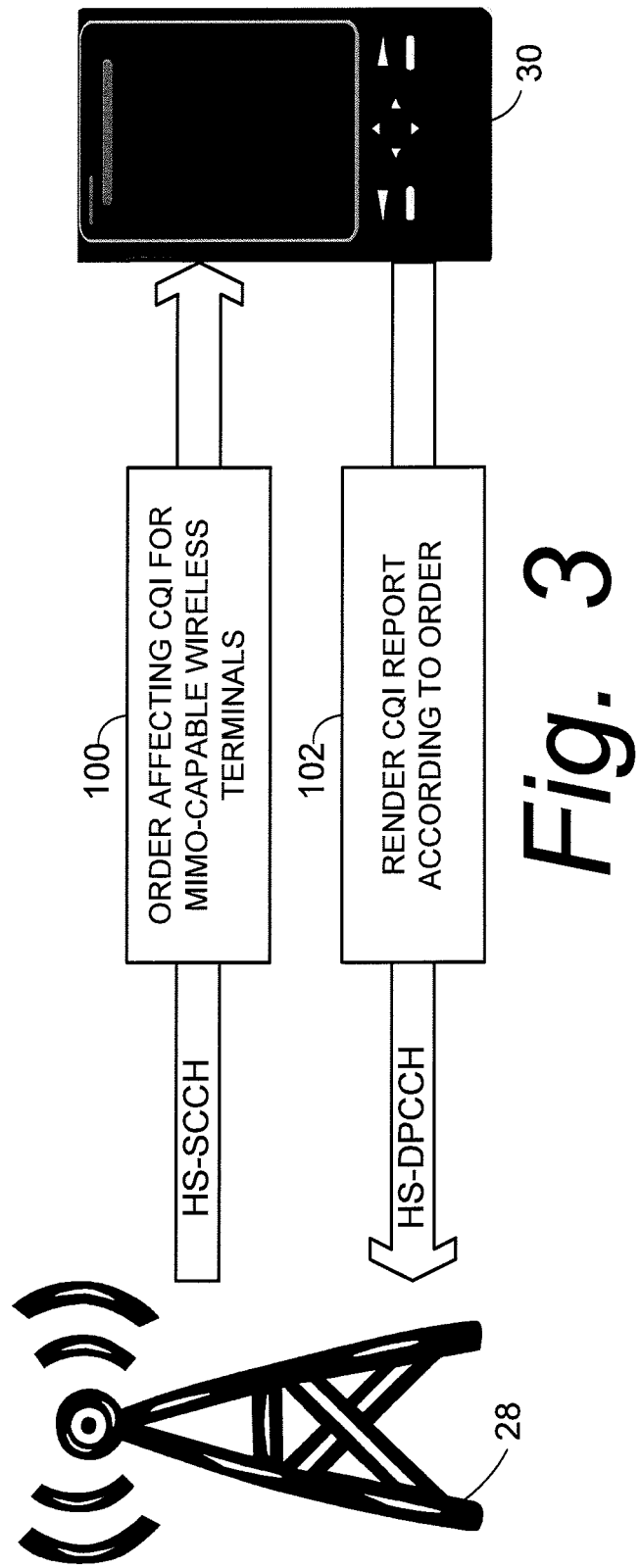

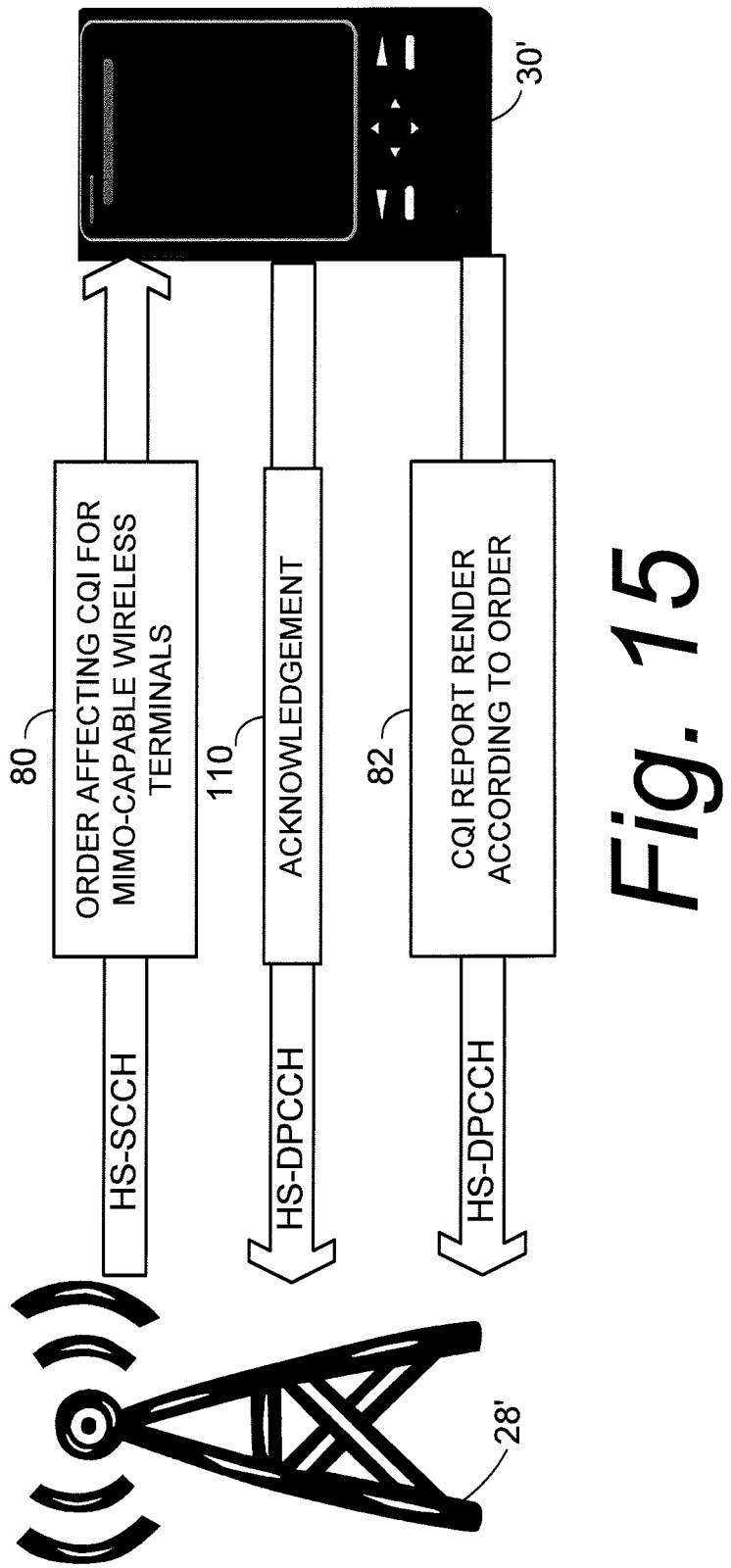

HS-SCCH ORDERS FOR CQI MODE SELECTION

This application claims the priority and benefit of U.S. Provisional patent application 61/023,346, filed Jan. 24, 2008, entitled "HS-SCCH ORDERS FOR CQI MODE SELECTION", which is incorporated by reference herein in its entirety.

BACKGROUND

This invention pertains to telecommunications, and particularly to wireless communications relating to whether a wireless terminal should operate in a single antenna or multiple antenna (e.g., Multiple-Input Multiple-Output (MIMO)) mode.

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with wireless capability (e.g., mobile termination), and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for user equipment units (UEs).

In a forum known as the Third Generation Partnership Project (3GPP), telecommunications suppliers propose and agree upon standards for third generation networks and UTRAN specifically, and investigate enhanced data rate and radio capacity. The Third Generation Partnership Project (3GPP) has undertaken to evolve further the UTRAN and GSM based radio access network technologies. One result of the forum's work is the High Speed Downlink Packet Access (HSDPA) for the downlink, which was introduced in 3GPP WCDMA specification Release 5. The High Speed Downlink Packet Access (HSDPA) was followed by introduction of High Speed Uplink Packet Access (HSUPA) with its Enhanced Dedicated Channel (E-DCH) in the uplink in 3GPP WCDMA specification Release 6.

High Speed Downlink Packet Access (HSDPA) achieves higher data speeds by, e.g., shifting some of the radio resource coordination and management responsibilities to the base station (RBS) from the radio network controller (RNC). Those responsibilities include one or more of the following: shared channel transmission, higher order modulation, link adaptation, radio channel dependent scheduling, and hybrid-ARQ with soft combining.

In accordance with the first of the shifted responsibilities, i.e., shared channel transmission, HSDPA multiplexes user information for transmission on the high-speed downlink shared channel (HS-DSCH) in time-multiplexed intervals (called transmission time intervals (TTI)) over the air interface to the mobile terminal. Three new physical channels were introduced with HSDPA to enable HS-DSCH transmission. Of these three, the high-speed shared control channel (HS-SCCH) is a downlink control channel that informs mobile devices when HSDPA data is scheduled for them, and how they can receive and decode it (e.g., the HS-SCCH provides timing and coding information allowing the wireless terminal to listen to the HS-DSCH at the correct time and using the correct codes). The high-speed dedicated physical control channel (HS-DPCCH) is an uplink control channel used by the mobile to report the downlink channel quality and request retransmissions. The high-speed physical downlink shared channel (HS-PDSCH) is a downlink physical channel that carries the HS-DSCH user data. Several HS-PDSCHs are assigned to a mobile for each transmission. Each HS-PDSCH has a different orthogonal variable spreading factor (OVSF) channelization code.

Multiple-Input Multiple-Output (MIMO) transmission schemes can be utilized to increase spectral efficiency. MIMO schemes assume that the transmitter and receiver are both equipped with multiple antennas, and that multiple modulated and precoded signals can be transmitted on the same "time-code resource".

Evolved HSPA (also known as: HSPA Evolution) is a wireless broadband standard defined in 3GPP release 7. HSPA+ provides HSPA data rates up to 28 Mbit/s on the downlink and 11 Mbit/s on the uplink with MIMO technologies and higher order modulation. HSPA+ supports 2×2 downlink MIMO that uses two transmit antennas at the Node B to transmit orthogonal (parallel) data streams to the two receive antennas at the wireless terminals. Using two antennas and additional signal processing at the receiver and the transmitter, MIMO can increase the system capacity and double user data rates without using additional Node B power or bandwidth.

The foregoing highlights the fact that some wireless terminals can operate either in a MIMO mode (which involves, e.g., two or more streams/channels of transmission from the base station) or a non-MIMO mode (one stream/channel of transmission from the base station).

One drawback with operation in the MIMO mode in high speed downlink packet access (HSDPA) is the extra overhead introduced in the related control signaling. For example, the MIMO downlink (DL) control channel, i.e., the high speed-shared control channel (HS-SCCH), may require two decibels (2 dB) more transmit power than the non-MIMO HS-SCCH. The extra two decibel or so power requirement occurs because more information needs to be transmitted to a user in MIMO mode, e.g., precoder weights and modulation information for up to two transport blocks must be signaled. Also in the MIMO mode the uplink (UL) overhead increases for MIMO users because the channel quality indicator (CQI) and hybrid Automatic Repeat-reQuest (HARQ) ACK/NACK information for two streams must be fed back to the base station.

For reasons such as those mentioned above, it is desirable to have wireless terminals operate in the MIMO mode only when the probability or need for dual stream transmission (e.g., use of multiple antennas by the wireless terminal) is sufficiently high. For example, if a wireless terminal reports that only one stream can be supported for some time, it is desirable to turn off the MIMO mode transmission for the reporting wireless terminal since the overhead needed for MIMO transmission does not pay off in increased performance. On the other hand, for a MIMO-capable wireless terminal which is operating in a non-MIMO mode, there currently is no good way to switch that wireless terminal into MIMO mode if conditions favor MIMO transmission.

The radio network controller (RNC) makes the determination for switching a wireless terminal between the MIMO mode and the non-MIMO mode. The mode in which the wireless terminal is to operate is sent over higher layers to the wireless terminal, and consequently the mode switching changes very slowly. Unfortunately, in conventional practice the radio network controller (RNC) does not know what quality each wireless terminal is experiencing.

A wireless terminal makes various measurements and reports to a base station certain channel quality indicator (CQI) reports. The channel quality indicator (CQI) reports received at a base station from a wireless terminal can be used by the base station scheduler to adapt the current transmissions to the wireless terminal to the actual channel conditions. In the current version of the WCDMA specification, Release 7, incorporated herein by reference, several different versions of CQIs exists to support different operation modes. For example, a "normal" CQI is used for wireless terminals not configured in multiple-input-multiple-output—(MIMO) mode, while either type A or type B CQI reports are used for MIMO-capable UE terminals operating in MIMO mode, i.e., capable of receiving multiple transmission streams using multiple antennas.

The normal CQI consists of five bits and serves as a representation of the received signal-to-noise ratio (SNR) that corresponds to a 10% block error rate (BLER) at the wireless terminal. For MIMO-capable wireless terminals, type A and B CQIs also include preferred precoder weights in addition to quantized signal to noise ratio (SNR) values. When a MIMO-capable wireless terminal is not configured in MIMO mode, the normal CQI report is used.

As mentioned above, currently there is no good way for a MIMO-capable wireless terminal currently in a non-MIMO mode to switch into MIMO mode if conditions favor MIMO transmission. One approach might be to monitor the non-MIMO CQI of that wireless terminal and then turn-on MIMO mode at the wireless terminal when a sufficiently high SNR is reported. However, a problem with this approach is that a normal CQI does not contain any antenna-related information. As a result, even if the SNR reported in the CQI were high, the two channels could nevertheless be sufficiently correlated that they would not be appropriate for MIMO transmission.

SUMMARY

In accordance with one of its aspects, the technology disclosed herein concerns a method for use in a communications network that comprises a base station which communicates over a radio interface with a wireless terminal. Both the base station and the wireless terminal have multiple-input multiple-output (MIMO) capabilities. The method comprises generating a MIMO-related order for inclusion in control signaling on a high speed downlink shared channel from the base station to the wireless terminal, with the MIMO-related order being configured to modify channel quality indication (CQI) communications between the wireless terminal and the base station in view of MIMO capabilities of the wireless terminal. The method further comprises providing a channel quality indication (CQI) report from the wireless terminal to the base station in accordance with the order.

In some example embodiments the method further comprises configuring the MIMO-related order to request that the wireless terminal provide a MIMO channel quality indication (CQI) when the wireless terminal is not operating in the MIMO mode. In response to the order, the wireless terminal provides a MIMO channel quality indication (CQI) when the wireless terminal is not operating in the MIMO mode.

In an example embodiment the method further comprises configuring the MIMO-related order to request that the wireless terminal provide a MIMO type A or MIMO type B channel quality indication (CQI) when the wireless terminal is not operating in the MIMO mode. In response to the order, the wireless terminal provides a MIMO type A or MIMO type B channel quality indication (CQI) when the wireless terminal is not operating in the MIMO mode.

In an example embodiment the method further comprises configuring the MIMO-related order to request that the wireless terminal provide a single MIMO channel quality indication (CQI) when the wireless terminal is not operating in the MIMO mode. In response to the order, the wireless terminal provides a single MIMO channel quality indication (CQI) when the wireless terminal is not operating in the MIMO mode.

In an example embodiment the method further comprises configuring the MIMO-related order to request that the wireless terminal provide, when the wireless terminal is not operating in the MIMO mode, a same pattern of MIMO type A and MIMO type B channel quality indications (CQIs) as was previously provided when the wireless terminal was operating in the MIMO mode. In response to the order, the wireless terminal provides the same pattern of MIMO type A and MIMO type B channel quality indications (CQIs) as was previously provided when the wireless terminal was operating in the MIMO mode.

In an example embodiment, the method comprises configuring the MIMO-related order to prescribe a pattern of MIMO type A and MIMO type B channel quality indications (CQIs) when the wireless terminal is not operating in the MIMO mode. In response, the wireless terminal provides the pattern of MIMO type A and MIMO type B channel quality indications (CQIs) from the wireless terminal to the base station in accordance with the order.

In an example implementation, a prescribed pattern of MIMO type A and MIMO type B channel quality indications (CQIs) is different from a previous pattern of MIMO type A and MIMO type B channel quality indications (CQIs) which as was previously provided when the wireless terminal was operating in the MIMO mode.

In an example embodiment the method further comprises configuring the MIMO-related order to request that the wireless terminal replace a non-MIMO channel quality indication (CQI) with a MIMO channel quality indication (CQI) when the wireless terminal is not operating in the MIMO mode. In accordance with the order, the wireless terminal replaces the non-MIMO channel quality indication (CQI) with the MIMO channel quality indication (CQI) when the wireless terminal is not operating in the MIMO mode.

In another example embodiment the method further comprises specifying with the MIMO-related order a measurement power offset value to be used by the wireless terminal when determining a MIMO channel quality indication (CQI). The method further comprises, in accordance with the order, determining and transmitting from the wireless terminal a MIMO channel quality indication (CQI) which uses the measurement power offset value.

In another of its aspects the technology disclosed herein concerns a base station which communicates over a radio interface with a wireless terminal having multiple-input multiple-output (MIMO) capabilities. The base station comprises a transceiver; a high speed downlink shared channel controller; and a control signal generator. The transceiver is configured to provide either MIMO transmissions or non-MIMO transmissions as needed over the radio interface to the wireless terminal. The high speed downlink shared channel controller is configured to schedule transmission of user data and control signaling over the radio interface on a high speed downlink shared channel. The control signal generator is configured to generate a MIMO-related order for inclusion in the control signaling on the high speed downlink shared channel. The MIMO-related order is configured to modify channel quality indication (CQI) communications between the wireless terminal and the base station in view of MIMO capabilities of the wireless terminal.

In some example embodiments of the base station, the MIMO-related order is configured to request that the wireless terminal provide a MIMO channel quality indication (CQI) when the wireless terminal is not operating in the MIMO mode.

In an example embodiment, the base station further comprises an uplink signal processor which, after receiving an acknowledgement of the MIMO-related order, automatically processes a channel quality indication (CQI) received from the wireless terminal as a MIMO channel quality indication (CQI) without having to determine whether the received channel quality indication (CQI) is a MIMO channel quality indication (CQI) or not.

In an example embodiment, the MIMO-related order is configured by the control signal generator to request that the wireless terminal provide a MIMO type A or MIMO type B channel quality indication (CQI) when the wireless terminal is not operating in the MIMO mode.

In an example embodiment, the MIMO-related order is configured by the control signal generator to request that the wireless terminal provide a single MIMO channel quality indication (CQI) when the wireless terminal is not operating in the MIMO mode In an example embodiment, the MIMO-related order is configured by the control signal generator to request that the wireless terminal provide, when the wireless terminal is not operating in the MIMO mode, a same pattern of MIMO type A and MIMO type B channel quality indications (CQIs) as was previously provided when the wireless terminal was operating in the MIMO mode.

In an example embodiment, the MIMO-related order is configured by the control signal generator to prescribe a pattern of MIMO type A and MIMO type B channel quality indications (CQIs) when the wireless terminal is not operating in the MIMO mode. In an example implementation, a prescribed pattern of MIMO type A and MIMO type B channel quality indications (CQIs) is different from a previous pattern of MIMO type A and MIMO type B channel quality indications (CQIs) which as was previously provided when the wireless terminal was operating in the MIMO mode.

In an example embodiment, the MIMO-related order is configured by the control signal generator to request that the wireless terminal replace a non-MIMO channel quality indication (CQI) with a MIMO channel quality indication (CQI) when the wireless terminal is not operating in the MIMO mode.

In an example embodiment, the MIMO-related order is configured by the control signal generator to specify a measurement power offset value to be used by the wireless terminal when determining a MIMO channel quality indication (CQI).

In an example embodiment the method further comprises the wireless terminal sending an acknowledgement of the MIMO-related order to the base station. Thereafter the base station automatically processes a channel quality indication (CQI) received from the wireless terminal as a MIMO channel quality indication (CQI) without having to determine whether the received channel quality indication (CQI) is a MIMO channel quality indication (CQI) or not.

In another of its aspects the technology disclosed herein concerns a wireless terminal which communicates over a radio interface with a base station. The wireless terminal comprises a transceiver; a high speed downlink shared channel controller; and a channel quality indication (CQI) reporter. The transceiver is configured to provide either MIMO transmissions or non-MIMO transmissions as needed over the radio interface to the base station. The high speed downlink shared channel controller is configured to interpret a MIMO-related order included in control signaling on the high speed downlink shared channel as requesting modification of channel quality indication (CQI) communications between the wireless terminal and the base station in view of MIMO capabilities of the wireless terminal. The channel quality indication (CQI) reporter is configured to report a MIMO channel quality indication (CQI) in accordance with the MIMO-related order.

In some example embodiments, the high speed downlink shared channel controller of the wireless terminal is configured to interpret the MIMO-related order as requesting that the wireless terminal provide a MIMO channel quality indication (CQI) when the wireless terminal is not operating in the MIMO mode. The channel quality indication (CQI) reporter is configured to accordingly provide the MIMO channel quality indication (CQI) when the wireless terminal is not operating in the MIMO mode.

In an example implementation, the high speed downlink shared channel controller of the wireless terminal is further configured, upon receiving the MIMO-related order the wireless terminal, to provide an acknowledgement signal to the base station configured to enable the base station to automatically process a channel quality indication (CQI) received from the wireless terminal as a MIMO channel quality indication (CQI) without having to determine whether the received channel quality indication (CQI) is a MIMO channel quality indication (CQI) or not.

In an example embodiment the high speed downlink shared channel controller of the wireless terminal is configured to interpret the MIMO-related order as requesting that the wireless terminal provide a single MIMO channel quality indication (CQI) when the wireless terminal is not operating in the MIMO mode. The channel quality indication (CQI) reporter is configured to accordingly provide the single MIMO channel quality indication (CQI) when the wireless terminal is not operating in the MIMO mode.

In an example embodiment the high speed downlink shared channel controller of the wireless terminal is configured to interpret the MIMO-related order as requesting that the wireless terminal provide, when the wireless terminal is not operating in the MIMO mode, a same pattern of MIMO type A and MIMO type B channel quality indications (CQIs) as was previously provided when the wireless terminal was operating in the MIMO mode. The channel quality indication (CQI) reporter is configured to accordingly provide the same pattern of MIMO type A and MIMO type B channel quality indications (CQIs) when the wireless terminal is not operating in the MIMO mode In an example embodiment the high speed downlink shared channel controller of the wireless terminal is configured to interpret the MIMO-related order as requesting that the wireless terminal provide a prescribed pattern of MIMO type A and MIMO type B channel quality indications (CQIs) when the wireless terminal is not operating in the MIMO mode. The channel quality indication (CQI) reporter is configured to accordingly provide the prescribed pattern of MIMO type A and MIMO type B channel quality indications (CQIs) when the wireless terminal is not operating in the MIMO mode.

In an example implementation, the prescribed pattern of MIMO type A and MIMO type B channel quality indications (CQIs) is different from a previous pattern of MIMO type A and MIMO type B channel quality indications (CQIs) which as was previously provided when the wireless terminal was operating in the MIMO mode.

In an example embodiment the high speed downlink shared channel controller of the wireless terminal is configured to interpret the MIMO-related order as requesting that the wireless terminal replace a non-MIMO channel quality indication (CQI) with a MIMO channel quality indication (CQI) when the wireless terminal is not operating in the MIMO mode. The channel quality indication (CQI) reporter is configured to accordingly replace the non-MIMO channel quality indication (CQI) with a MIMO channel quality indication (CQI) when the wireless terminal is not operating in the MIMO mode.

In an example embodiment the high speed downlink shared channel controller of the wireless terminal is configured to interpret the MIMO-related order as including a measurement power offset value to be used by the wireless terminal when determining a MIMO channel quality indication (CQI). The channel quality indication (CQI) reporter is configured to accordingly use the measurement power offset value to be used by the wireless terminal when determining a MIMO channel quality indication (CQI).

Embodiments including those described herein have, as at least one advantage, provision of information suitable for making a decision for a MIMO-capable wireless terminal currently in a non-MIMO mode to switch into MIMO mode if conditions favor MIMO transmission.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is a diagrammatic view showing the example basic or representative acts or steps of FIG. 2.

FIG. 15 is a diagrammatic view showing the example basic or representative acts or steps of FIG. 2 as augmented by an acknowledgement message sent by a wireless terminal to a base station.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
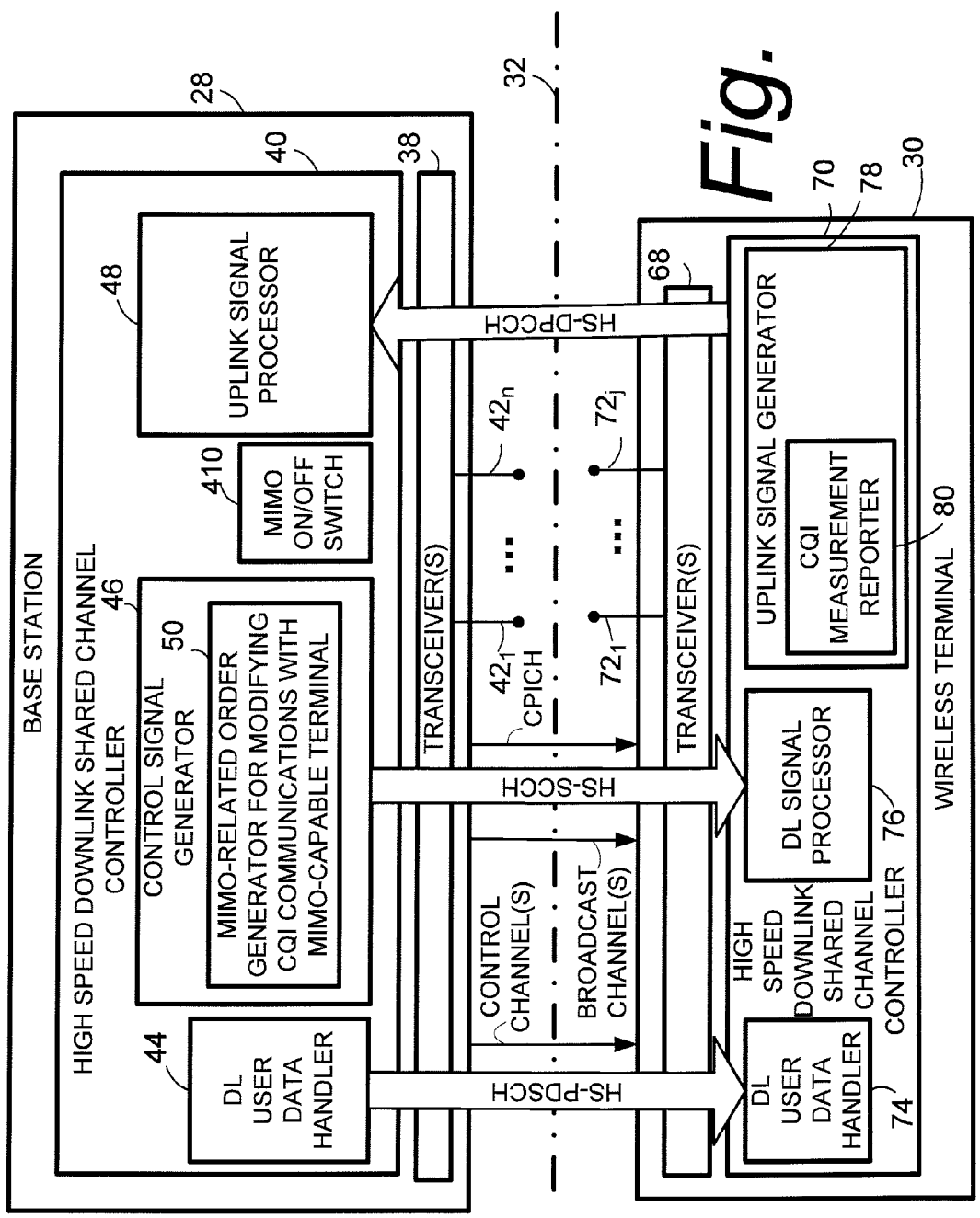
FIG. 1 is a diagrammatic view of at least a portion of an example a radio access network comprising an example embodiment base station, the base station comprising a MIMO-related order generator which modifies CQI communications.

FIG. 1 shows at least a portion of a radio access network (RAN) and particularly illustrates an example network node 28 which communicates with a wireless terminal 30 across an air interface 32. In some example embodiments the network node is a base station, for which reason reference is made herein to base station 28. Those skilled in the art will also appreciate that a base station is sometimes also referred to in the art as a radio base station, a node B, or B-node, or eNodeB (all of which are used interchangeably herein).

Several different types of channels may exist across air interface 32 between base station 28 and wireless terminal 30 for transport of control and user data. For example, in the forward or downlink direction, there are several types of broadcast channels, one or more control channels, one or more common traffic channels (CCH), a common pilot channel (CPICH), dedicated traffic channels (DPCH), and the high-speed downlink shared channel (HS-DSCH). The downlink dedicated physical channel (DPCH) carries both the Dedicated Physical Data Channel (DPDCH) and the Dedicated Physical Control Channel (DPCCH). FIG. 1 illustrates in simplified form the high-speed physical downlink shared channel (HS-PDSCH), the high-speed shared control channel (HS-SCCH), and the high-speed uplink dedicated physical control channel (HS-DPCCH), all of which comprise the high-speed downlink shared channel (HSDSCH).

FIG. 1 also shows that base station 28 comprises, among other entities and functionalities, one or more transceivers 38 and high speed downlink shared channel controller 40. The base station 28 is capable of MIMO transmissions across air interface 32 to one or more wireless terminals. In view of the MIMO capabilities of base station 28, transceiver(s) 38 are connected to plural antennas $42_1$-$42_n$.

The high speed downlink shared channel controller 40 comprises, e.g., downlink user data handler 44; control signal generator 46; uplink signal processor 48; and MIMO ON/OFF switch 410. The downlink user data handler 44 serves to prepare and format user data for transmission across air interface 32 on a downlink shared channel such as HS-PDSCH, for example. The control signal generator 46 generates and formats downlink signaling across air interface 32 on a channel such as the HSSCCH, for example. The uplink signal processor 48 receives and processes signals received on the uplink across air interface 32 on an uplink signaling channel such as the high-speed dedicated physical control channel (HS-DPCCH). The MIMO ON/OFF switch 49 determines, for each individual wireless terminal which participates in the HSPDA, whether to switch from a MIMO mode to a non-MIMO mode, or vise-versa (e.g., from a non-MIMO mode to a MIMO mode).

Typically the high speed downlink shared channel controller 40 is situated at or comprises a base station of radio access network (RAN). The term "network node" is employed herein to the extent that functions of high speed downlink shared channel controller 40 may be located at another radio access network node or entity.

As understood by those skilled in the art, certain "orders" are carried or conveyed by the downlink signaling channel (e.g., HS-SCCH) to the wireless terminal 30. Heretofore such HS-SCCH orders have signaled discontinuous reception (DRX) activation or deactivation, discontinuous transmission (DTX) activation or deactivation, and HS-SCCH-less operation activation. See, e.g., 3GPP TS 25.212 V8.3.0 (20010-09), 3rd Generation Partnership Project; Technical Specification Group Radio Access Network; Multiplexing and channel coding (FDD)(Release 8), incorporated herein by reference in its entirety, and particularly section 4.6C. Control signal generator 46 is capable of generating such conventional orders. Moreover, in accordance with the technology disclosed herein, control signal generator 46 also comprises MIMO-related order generator 50. As explained herein, MIMO-related order generator 50 generates further orders which pertain to the channel quality indication (CQI) requesting/generation for MIMO-capable terminals, and thus serves to modify CQI communications with MIMO-capable terminals.

The example wireless terminal 30 illustrated in FIG. 1 comprises one or more transceivers 68 and terminal high speed downlink shared channel controller 70. The wireless terminal 30 of FIG. 1 is a MIMO-capable terminal, and as such the transceiver(s) 68 comprises or is connected to plural antennas $72_1$-$72_j$.

Terminal high speed downlink shared channel controller 70 comprises e.g., downlink user data handler 74; downlink control signal processor 76; and uplink signal generator 78. The downlink user data handler 74 serves to process and deformat user data received across air interface 32 from base station 28 on the downlink shared channel (e.g., HS-PDSCH). The control signal processor 46 receives, interprets, and processes the downlink signaling (including HS-SCCH orders) received across air interface 32 from base station 28 on a downlink signaling channel (e.g., HS-SCCH). The uplink signal generator 78 generates signals for transmission on an uplink signaling channel, such as the high-speed dedicated physical control channel (HS-DPCCH). Such uplink control channel can be used by wireless terminal 30 to report the downlink channel quality and request retransmissions. To this end, uplink signal generator 78 is shown in FIG. 1 as comprising CQI measurement reporter 80.

Figure 2:
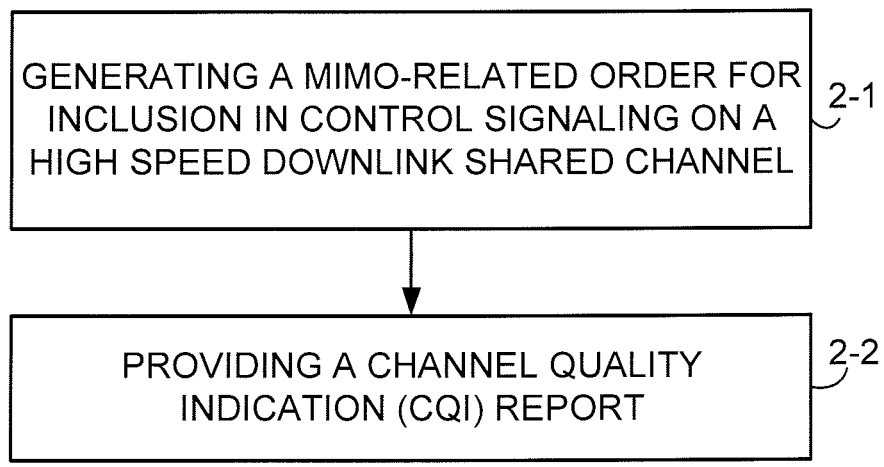
FIG. 2 is a flowchart showing example basic or representative acts or steps performed in conjunction with a generic method involving a MIMO-related order.

FIG. 2 and FIG. 3 show example basic or representative acts or steps performed in conjunction with a generic method of the technology disclosed herein. Act 2-1 of the basic method comprises generating a MIMO-related order 90 (see FIG. 3) for inclusion in control signaling on a high speed downlink shared channel from base station 28 to wireless terminal 30. The MIMO-related order 90 can be generated, for example, by MIMO-related order generator 50 of FIG. 1. The MIMO-related order 90 is preferably included in the high-speed shared control channel (HS-SCCH). The MIMO-related order 90 is configured to modify channel quality indication (CQI) communications between the wireless terminal and the base station in view of MIMO capabilities of the wireless terminal. The MIMO-related order 90 which modifies CQI communications is thus unlike the conventional HS-SCCH orders which (as mentioned above) have served as functions as to signal discontinuous reception (DRX) activation or deactivation, discontinuous transmission (DTX) activation or deactivation, and HS-SCCH-less operation activation. Various embodiments of how the MIMO-related order modifies the channel quality indication (CQI) communications are described further below.

Act 2-2 of the basic method comprises providing a channel quality indication (CQI) report 92 (see FIG. 3) from the wireless terminal 30 to the base station in accordance with the order 90. The channel quality indication (CQI) report 92 can be generated, for example, by CQI measurement reporter 80 shown in FIG. 1 and can be included in the uplink signaling channel, e.g., the HS-DPCCH channel.

Upon receipt of a channel quality indication (CQI) report 92 such as that generated and provided as act 2-2, the base station 28 can determine whether any adjustments or modifications are necessary in its operation for transmission of the high speed downlink shared channel (e.g., power adjustments, codeword allocations, or other scheduling adjustments) for the high-speed downlink shared channel (HS-DSCH). Moreover, upon receipt of the channel quality indication (CQI) report the base station 28 (e.g., MIMO ON/OFF switch 49) can determine whether it is desirable to change from a MIMO mode to a non-MIMO mode, or vise-versa.

In some example embodiments and modes, the technology disclosed herein comprises configuring the MIMO-related order carried on the HS-SCCH to request that the wireless terminal provide a MIMO channel quality indication (CQI) when the wireless terminal is not operating in the MIMO mode. Whereas the wireless terminal 30 typically does provide special channel quality indication (CQI) reports that reflect MIMO operation of the wireless terminal 30 (e.g., type A or type B CQI reports), ordinarily only a normal CQI report is provided by the wireless terminal 30 when the wireless terminal 30 operates in a non-MIMO mode. As mentioned previously, the "normal" CQI consists of five bits and serves as a representation of the received signal-to-noise ratio (SNR) that corresponds to a 10% block error rate (BLER) at the wireless terminal.

Figure 4:
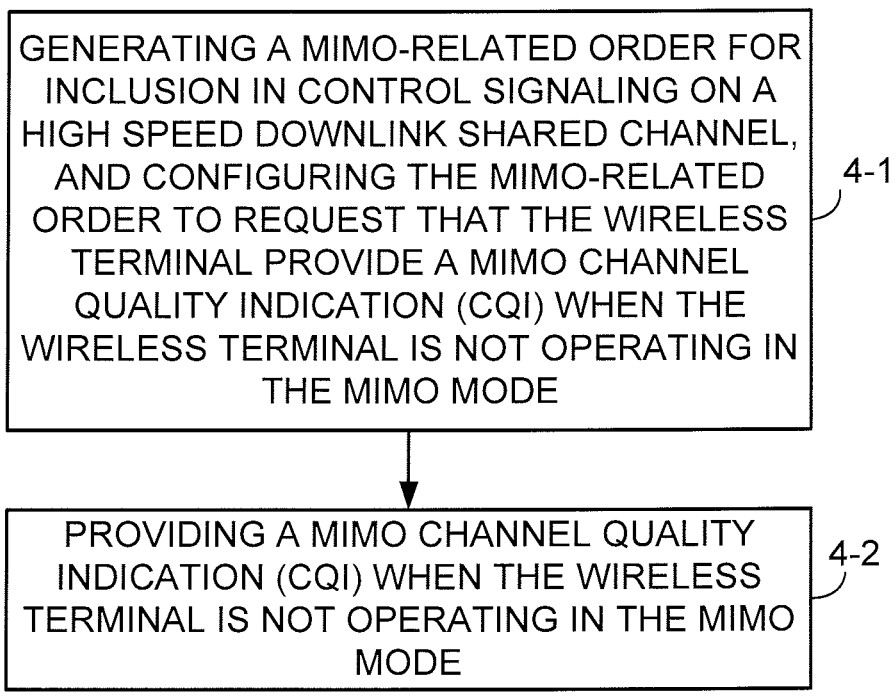
FIG. 4 is a flowchart showing example basic or representative acts or steps performed in conjunction with various modes and embodiments wherein a MIMO-related order requests that a wireless terminal provide a MIMO channel quality indication (CQI) when the wireless terminal is not operating in the MIMO mode.

FIG. 4 thus shows an example embodiment and mode wherein act 4-1 comprises generating a MIMO-related order for inclusion in control signaling on a high speed downlink shared channel from base station 28 to wireless terminal 30, and configuring the MIMO-related order to request that the wireless terminal provide a MIMO channel quality indication (CQI) when the wireless terminal is not operating in the MIMO mode. Act 4-2 of FIG. 4 comprise the wireless terminal 30 providing, in response to the order, a MIMO channel quality indication (CQI) when the wireless terminal is not operating in the MIMO mode.

It should be understood that any act herein described of requesting that the wireless terminal provide a particular MIMO channel quality indication (CQI) (when the wireless terminal is not operating in the MIMO mode) can comprise requesting that the wireless terminal replace a non-MIMO channel quality indication (CQI) with a MIMO channel quality indication (CQI) when the wireless terminal is not operating in the MIMO mode. Alternatively, in at least some implementations, the particularly requested MIMO channel quality indication (CQI) can be in addition to the "normal" channel quality indication (CQI) which is provided when the wireless terminal is not operating in the MIMO mode.

Figure 5A:
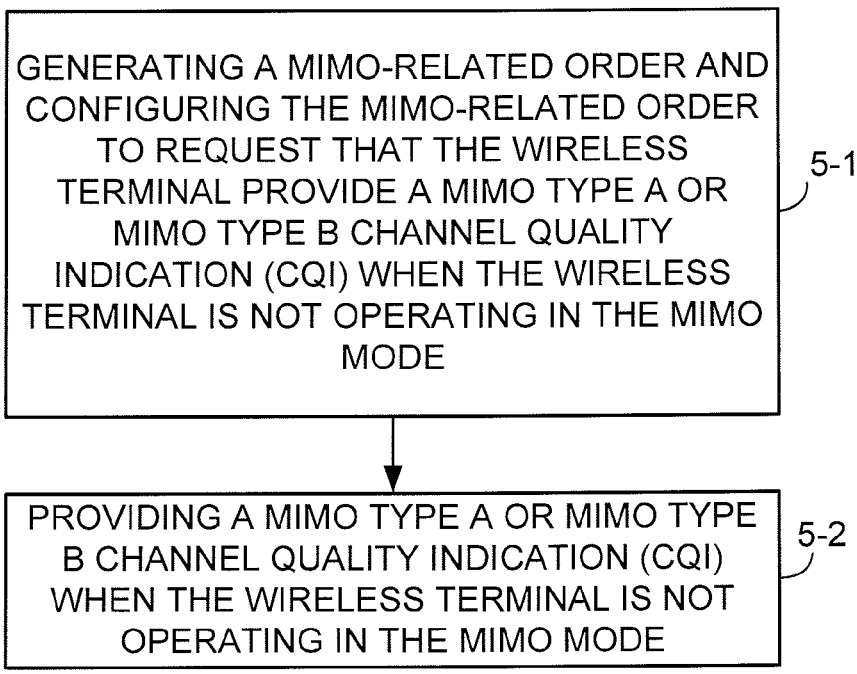
FIG. 5A a flowchart showing example basic or representative acts or steps performed in conjunction with a first example implementation of FIG. 4.
Figure 5B:
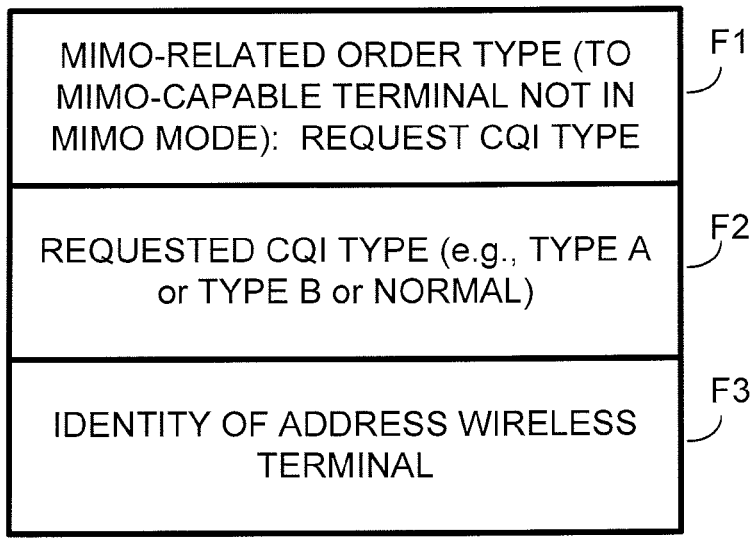
FIG. 5B is a diagrammatic view of an example format of an appropriate order for the first example implementation.

FIG. 5A and FIG. 5B illustrate a first example implementation of the embodiment and mode of FIG. 4. FIG. 5A shows example, representative acts of steps of the implementation; FIG. 5B illustrates an example format of an appropriate order for inclusion in the high-speed shared control channel (HS-SCCH).

Act 5-1 of FIG. 5A comprises generating a MIMO-related order and configuring the MIMO-related order to request that the wireless terminal provide a MIMO type A or MIMO type B channel quality indication (CQI) or "normal" CQI when the wireless terminal is not operating in the MIMO mode. Act 5-2 of FIG. 5A comprises the wireless terminal, in response to the order of act 5-1, providing a MIMO type A or MIMO type B channel quality indication (CQI) or a "normal" channel quality indication (CQI) when the wireless terminal is not operating in the MIMO mode.

Typically a conventional order included in the high-speed shared control channel (HS-SCCH) has three fields: a first field (F1) which indicates an order type (e.g., an "order type" field); a second field (F2) which specifies the order (e.g., an "order" field); and a third field (F3) which specifies an identity of the wireless terminal to which the order is addressed or applies (e.g., a "UE identity" field). Usually the first field (F1) is three bits in length; the second field (F2) is three bits in length; and the third field (F3) is sixteen bits in length. See again, e.g., 3GPP TS 25.212 V8.3.0 (20010-09), 3rd Generation Partnership Project; Technical Specification Group Radio Access Network; Multiplexing and channel coding (FDD)(Release 8), incorporated herein by reference in its entirely, and particularly section 4.6C.

FIG. 5B illustrates an example format of the MIMO-related order of act 5-1 in an implementation wherein the order of act 5-1 has substantially the same field patterns as described 3GPP TS 25.212 V8.3.0 (20010-09), section 4.6C. Field F1 of the MIMO-related order of act 5-1 contains a value that is different from the conventional order type values (e.g., different from the order type values which would signify the conventional operations of discontinuous reception (DRX) activation or deactivation, discontinuous transmission (DTX) activation or deactivation, and HS-SCCH-less operation activation). In particular, field F1 of the MIMO-related order of act 5-1 contains a value that signifies that the purpose of the order is to request a particular MIMO CQI type when the MIMO-capable wireless terminal is not operating in the MIMO mode. By preconfiguration the MIMO-related order of act 5-1 can be understood by both the base station and the wireless terminal to apply to just one (e.g. a "single" or "sole") or plural (e.g., a series of consecutive) CQI reports to be provided by the wireless terminal.

Field F2 of the MIMO-related order of act 5-1 contains a value that specifies what particular MIMO CQI type is being requested. In other words, either a value indicative of the MIMO type A channel quality indication (CQI), the MIMO type B channel quality indication (CQI), or the "normal" channel quality indication (CQI) is contained in Field F2 of the MIMO-related order of act 5-1. Field F3 of the MIMO-related order of act 5-1 specifies which particular one of plural possible wireless terminals is addressed (e.g., to which wireless terminal the HS-SCCH MIMO-related CQI order applies).

Thus, in one example implementation illustrated in FIG. 5A and FIG. 5B, the radio communications between the radio access network (RAN) and wireless terminal 30 are based on WCDMA and a HS-DSCH is used to transmit data to the wireless terminal. The channel quality report includes a channel quality indicator (CQI), the radio control channel is a HS-SCCH, and the message is an existing control message. The existing control message is an HS-SCCH order, and the HS-SCCH order includes a first field (F 1) indicating a CQI report and a second field (F2) indicating whether the CQI should be "normal", type A, or type B.

Figure 6A:
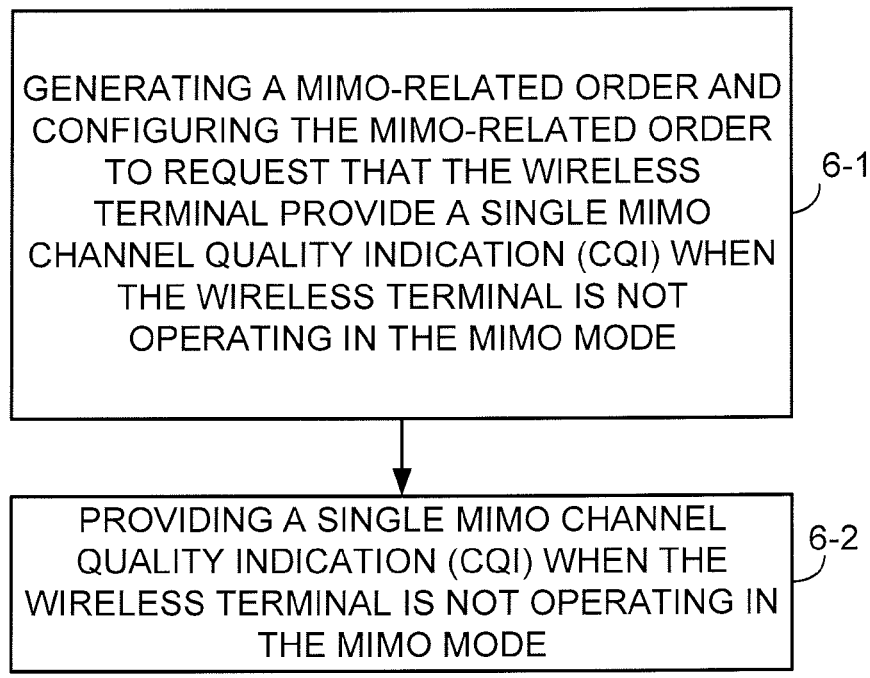
FIG. 6A a flowchart showing example basic or representative acts or steps performed in conjunction with a second example implementation of FIG. 4.
Figure 6B:
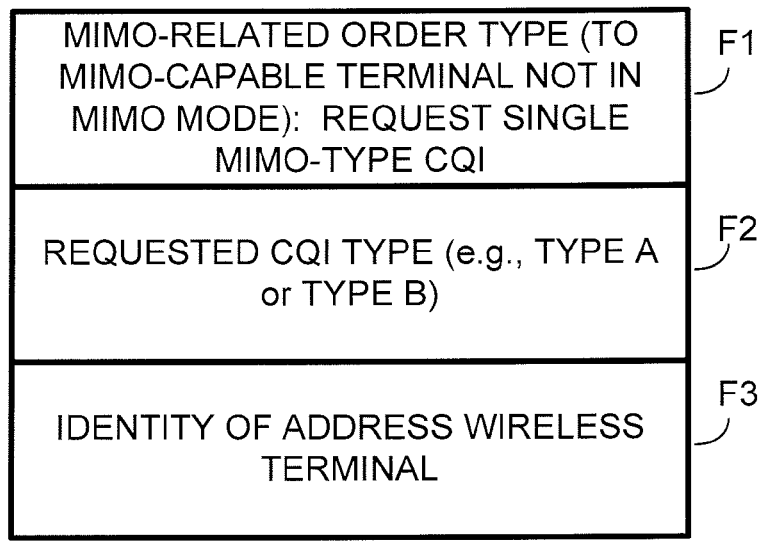
FIG. 6B is a diagrammatic view of an example format of an appropriate order for the second example implementation.

FIG. 6A and FIG. 6B illustrate a second example implementation of the embodiment and mode of FIG. 4. In corresponding fashion as the preceding figures, FIG. 6A shows example, representative acts of steps of the implementation; FIG. 6B illustrates an example format of an appropriate order for inclusion in the high-speed shared control channel (HS-SCCH).

Act 6-1 of FIG. 6A comprises generating a MIMO-related order and configuring the MIMO-related order to request that the wireless terminal provide a single (i.e., only one) MIMO channel quality indication (CQI) when the wireless terminal is not operating in the MIMO mode. Act 6-2 of FIG. 6A comprises the wireless terminal, in response to the order of act 6-1, providing a single MIMO channel quality indication (CQI) when the wireless terminal is not operating in the MIMO mode.

FIG. 6B illustrates an example format of the MIMO-related order of act 6-1, also in an implementation wherein the order of act 6-1 has substantially the same field patterns as described 3GPP TS 25.212 V8.3.0 (20010-09), section 4.6C. Field F1 of the MIMO-related order of act 6-1 contains a value that is different from the conventional order type values. In particular, field F1 of the MIMO-related order of act 6-1 contains a value that signifies that the purpose of the order is to request a single MIMO channel quality indication (CQI) when the MIMO-capable wireless terminal is not operating in the MIMO mode. Field F2 of the MIMO-related order of act 6-1 contains a value that specifies what particular MIMO CQI type is being requested. In other words, a either a value indicative of the MIMO type A channel quality indication (CQI), the MIMO type B channel quality indication (CQI), or the "normal" channel quality indication (CQI) is contained in Field F2 of the MIMO-related order of act 6-1. Field F3 of the MIMO-related order of act 6-1 specifies which particular one of plural possible wireless terminals is addressed (e.g., to which wireless terminal the HS-SCCH MIMO-related CQI order applies).

Figure 7A:
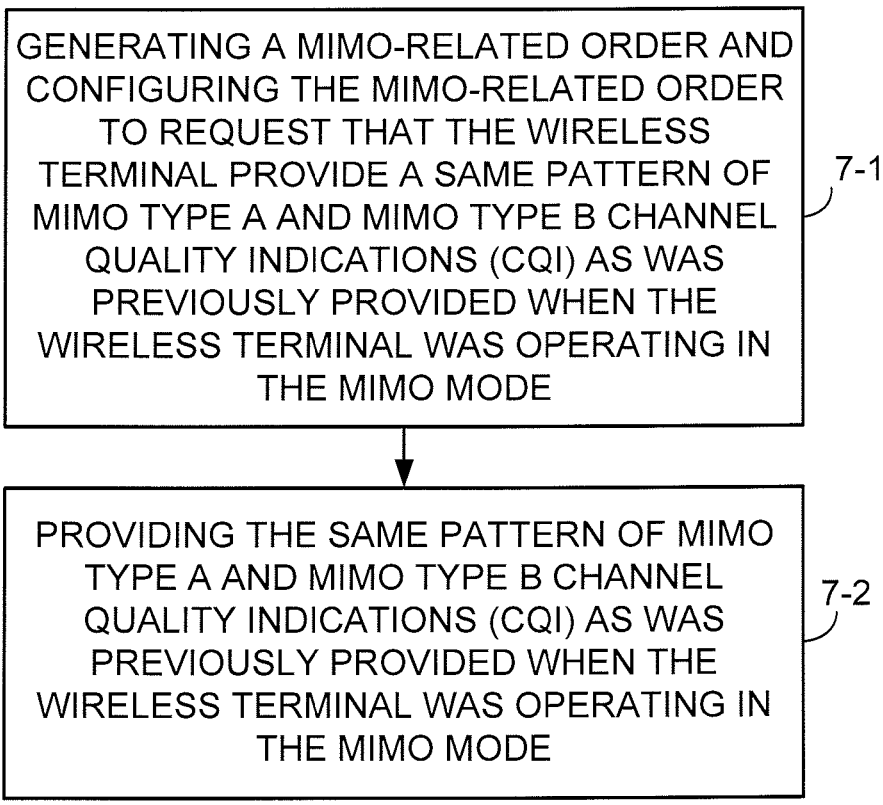
FIG. 7A a flowchart showing example basic or representative acts or steps performed in conjunction with a third example implementation of FIG. 4.
Figure 7B:
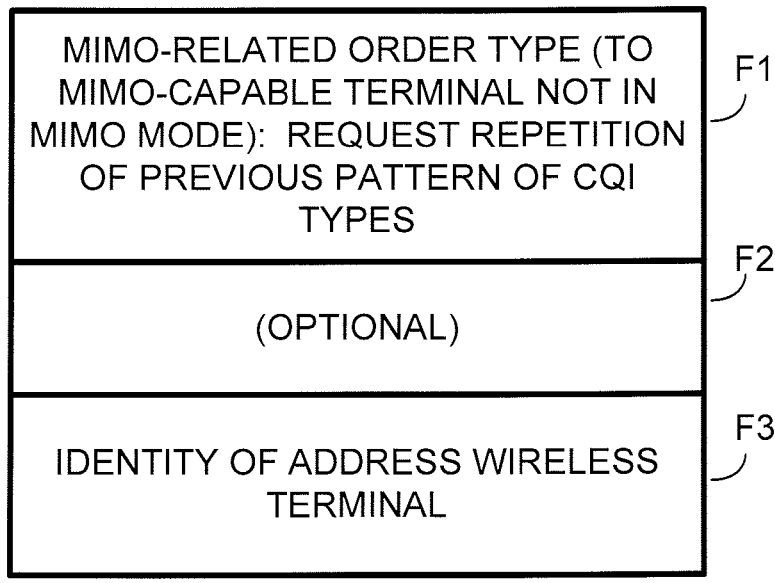
FIG. 7B is a diagrammatic view of an example format of an appropriate order for the third example implementation.

FIG. 7A and FIG. 7B illustrate a third example implementation of the embodiment and mode of FIG. 4. In corresponding fashion as the preceding figures, FIG. 7A shows example, representative acts of steps of the implementation; FIG. 7B illustrates an example format of an appropriate order for inclusion in the high-speed shared control channel (HS-SCCH).

A purpose of the implementation of FIG. 7A and FIG. 7B is to extend a current or previous repetition pattern of type A and B MIMO channel quality indications (CQI).

Act 7-1 of FIG. 7A comprises generating a MIMO-related order and configuring the MIMO-related order to request that the wireless terminal provide, when the wireless terminal is not operating in the MIMO mode, a same pattern of MIMO type A and MIMO type B channel quality indications (CQIs) as was previously provided when the wireless terminal was operating in the MIMO mode. Act 7-2 of FIG. 7A comprises the wireless terminal, in response to the order of act 7-1, providing the same pattern of MIMO type A and MIMO type B channel quality indications (CQIs) as was previously provided when the wireless terminal was operating in the MIMO mode.

FIG. 7B illustrates an example format of the MIMO-related order of act 7-1, also in an implementation wherein the order of act 7-1 has substantially the same field patterns as described 3GPP TS 25.212 V8.3.0 (20010-09), section 4.6C. Field F1 of the MIMO-related order of act 7-1 contains a value that is different from the conventional order type values. In particular, field F1 of the MIMO-related order of act 7-1 contains a value that signifies that the purpose of the order is to request that the wireless terminal provide, when the wireless terminal is not operating in the MIMO mode, a same pattern of MIMO type A and MIMO type B channel quality indications (CQIs) as was previously provided when the wireless terminal was operating in the MIMO mode. In view of the fact that the previous MIMO CQI pattern is still remembered by the wireless terminal, Field F2 of the MIMO-related order of act 7-1 need not necessarily be utilized and therefore is shown as "optional" or empty in FIG. 7B. Alternatively, a value indicative of the previous pattern can be included in field F2. Field F3 of the MIMO-related order of act 7-1 specifies which particular one of plural possible wireless terminals is addressed (e.g., to which wireless terminal the HS-SCCH MIMO-related CQI order applies).

Figure 8A:
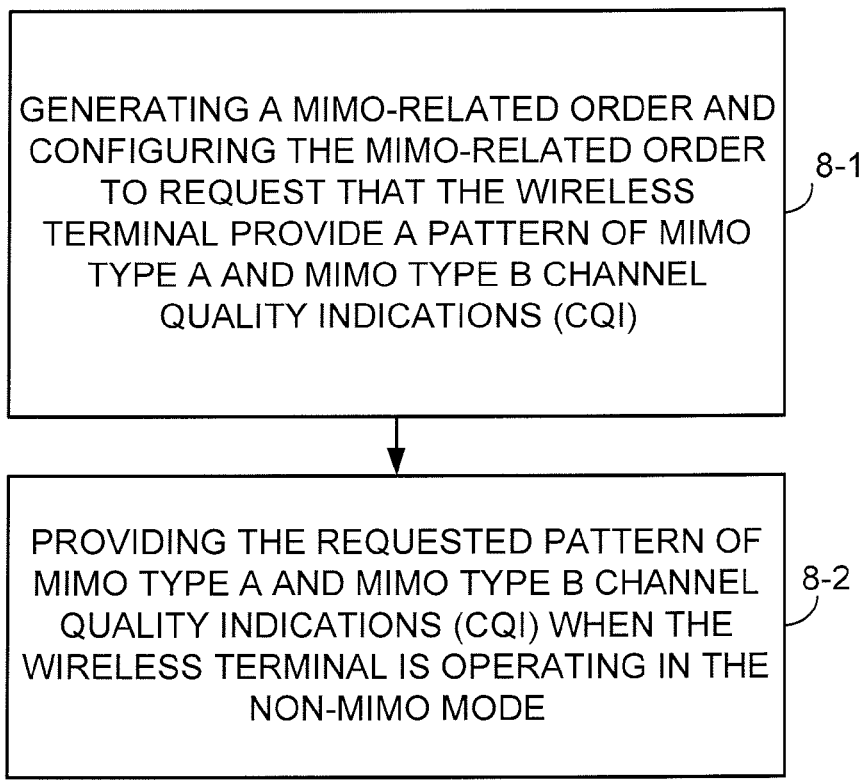
FIG. 8A is a flowchart showing example basic or representative acts or steps performed in conjunction with a fourth example implementation of FIG. 4.
Figure 8B:
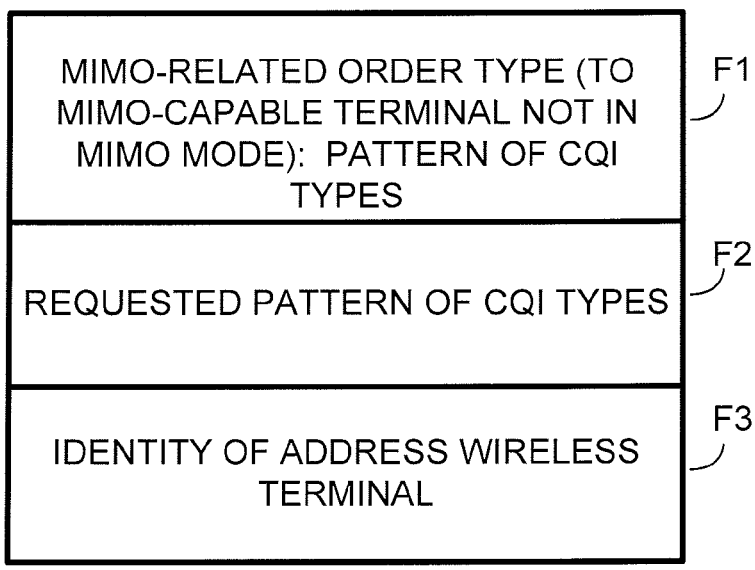
FIG. 8B is a diagrammatic view of an example format of an appropriate order for the fourth example implementation.

FIG. 8A and FIG. 8B illustrate a fourth example implementation of the embodiment and mode of FIG. 4. In corresponding fashion as the preceding figures, FIG. 8A shows example, representative acts of steps of the implementation; FIG. 8B illustrates an example format of an appropriate order for inclusion in the high-speed shared control channel (HS-SCCH).

Act 8-1 of FIG. 8A comprises generating a MIMO-related order and configuring the MIMO-related order to prescribe a pattern of MIMO type A and MIMO type B channel quality indications (CQIs) when the wireless terminal is not operating in the MIMO mode. The pattern prescribed by act 8-1 can be a new pattern of MIMO type A and MIMO type B channel quality indications (CQIs) e.g., a pattern which was not previously provided when the wireless terminal was operating in the MIMO mode. Act 8-2 of FIG. 8A comprises the wireless terminal, in response to the order of act 8-1, providing the pattern of MIMO type A and MIMO type B channel quality indications (CQIs) as was requested by act 8-1.

FIG. 8B illustrates an example format of the MIMO-related order of act 8-1, also in an implementation wherein the order of act 8-1 has substantially the same field patterns as described 3GPP TS 25.212 V8.3.0 (20010-09), section 4.6C. Field F1 of the MIMO-related order of act 8-1 contains a value that is different from the conventional order type values. In particular, field F1 of the MIMO-related order of act 8-1 contains a value that signifies that the purpose of the order is to request that the wireless terminal provide, when the wireless terminal is not operating in the MIMO mode, a particular pattern of MIMO type A and MIMO type B channel quality indications (CQIs). Field F2 of the MIMO-related order of act 8-1 specifies that particular pattern of CQIs that is now requested. Field F3 of the MIMO-related order of act 8-1 specifies which particular one of plural possible wireless terminals is addressed (e.g., to which wireless terminal the HS-SCCH MIMO-related CQI order applies).

Thus, the implementation of FIG. 8A and FIG. 8B permits a changing of a reporting cycle, i.e., changing N and M, using HS-SCCH orders. In other words, as understood from a previous implementation, the ratio N/M can be changed.

Figure 9A:
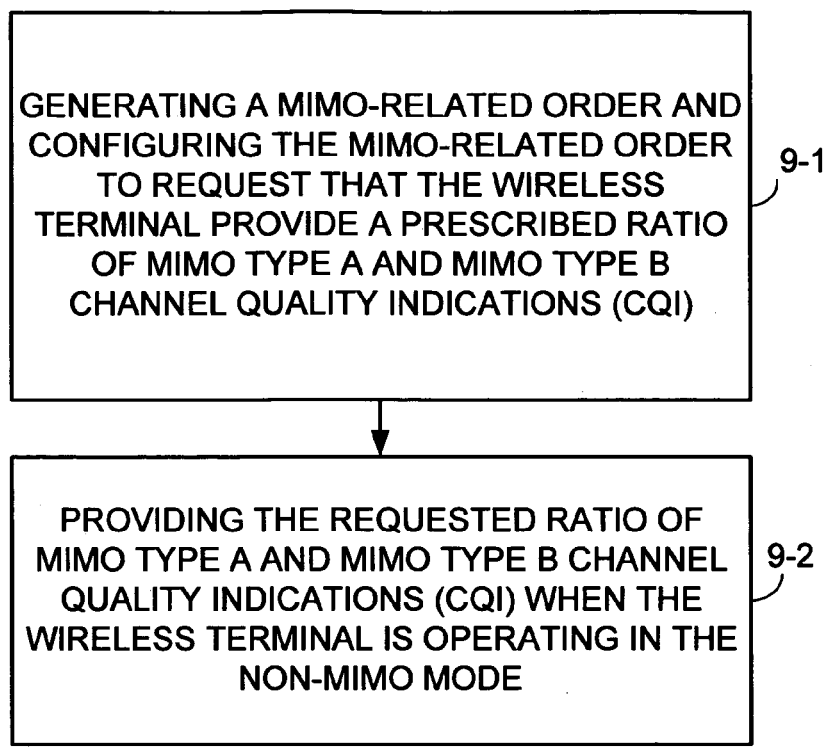
FIG. 9A a flowchart showing example basic or representative acts or steps performed in conjunction with a fifth example implementation of FIG. 4.
Figure 9B:
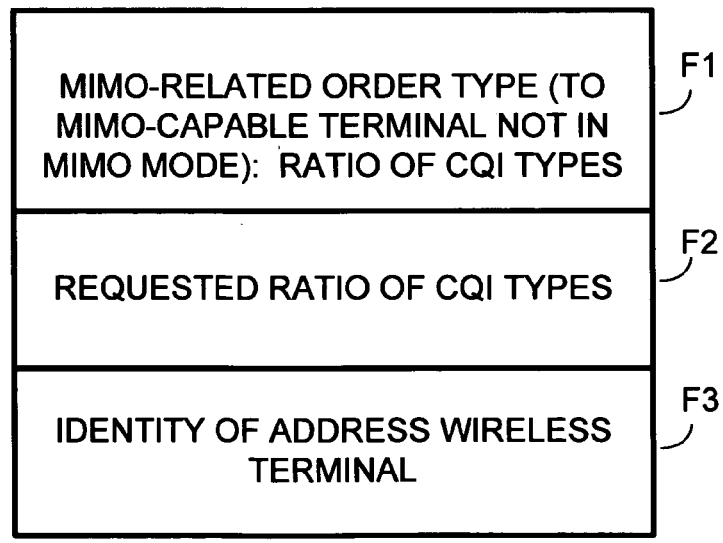
FIG. 9B is a diagrammatic view of an example format of an appropriate order for the fifth example implementation.

FIG. 9A and FIG. 9B illustrate a fifth example implementation of the embodiment and mode of FIG. 4. In corresponding fashion as the preceding figures, FIG. 9A shows example, representative acts of steps of the implementation; FIG. 9B illustrates an example format of an appropriate order for inclusion in the high-speed shared control channel (HS-SCCH).

A purpose of the implementation of FIG. 9A and FIG. 9B is to set a ratio between the reports of type A and type B CQIs that a MIMO-capable wireless terminal is to send in its MIMO mode of operation. For example, the network can instruct the wireless terminal that every N out of M CQIs it reports should be of type B. Setting this ratio N:M to ¼, for example, means that one out of four reported CQIs is of type B and the rest are type A. The technology disclosed herein and illustrated by FIG. 9A and FIG. 9B allows a MIMO-capable wireless terminal, not operating in a MIMO mode, to be ordered to report and to report a MIMO CQI with a certain ratio. For example, a ratio set to ¼ means that one in four reported CQIs from the wireless terminal should be a MIMO CQI.

Act 9-1 of FIG. 9A comprises generating a MIMO-related order and configuring the MIMO-related order to request that the wireless terminal provide a specific or prescribed ratio of MIMO type A and MIMO type B channel quality indications (CQI). Act 9-2 of FIG. 9A comprises the wireless terminal, in response to the order of act 9-1, providing the prescribed ratio of MIMO type A and MIMO type B channel quality indications (CQIs).

FIG. 9B illustrates an example format of the MIMO-related order of act 9-1, also in an implementation wherein the order of act 9-1 has substantially the same field patterns as described 3GPP TS 25.212 V8.3.0 (20010-09), section 4.6C. Field F1 of the MIMO-related order of act 9-1 contains a value that is different from the conventional order type values. In particular, field F1 of the MIMO-related order of act 9-1 contains a value that signifies that the purpose of the order is to request that the wireless terminal provide, when the wireless terminal is not operating in the MIMO mode, a prescribed ratio of MIMO type A and MIMO type B channel quality indications (CQIs). Field F2 of the MIMO-related order of act 9-1 contains a value which is indicative of the prescribed ratio. Field F3 of the MIMO-related order of act 9-1 specifies which particular one of plural possible wireless terminals is addressed (e.g., to which wireless terminal the HS-SCCH MIMO-related CQI order applies).

Figure 10A:
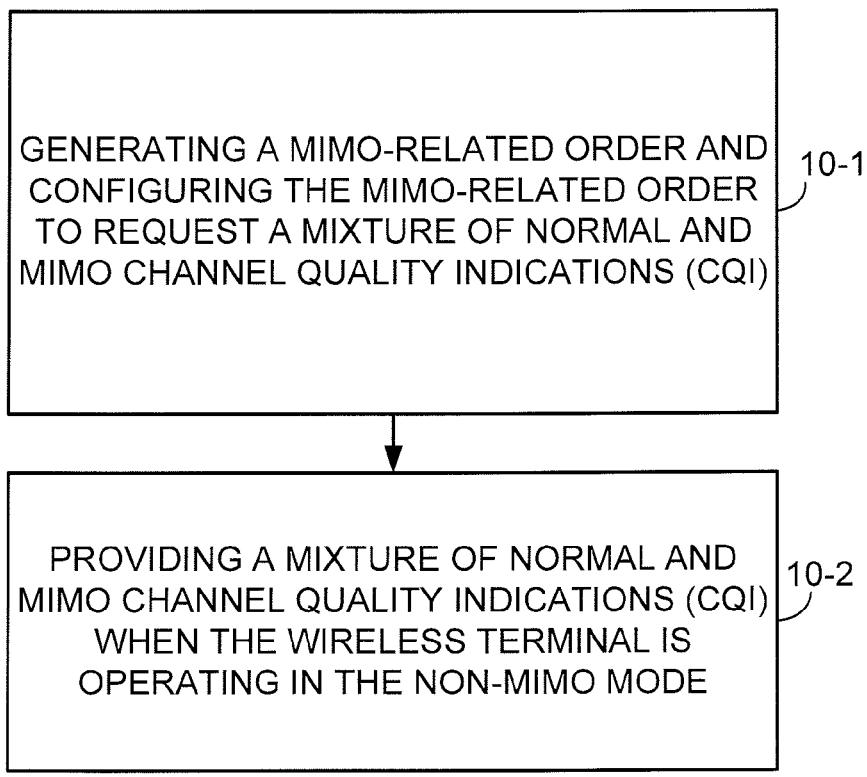
FIG. 10A a flowchart showing example basic or representative acts or steps performed in conjunction with a sixth example implementation of FIG. 4.
Figure 10B:
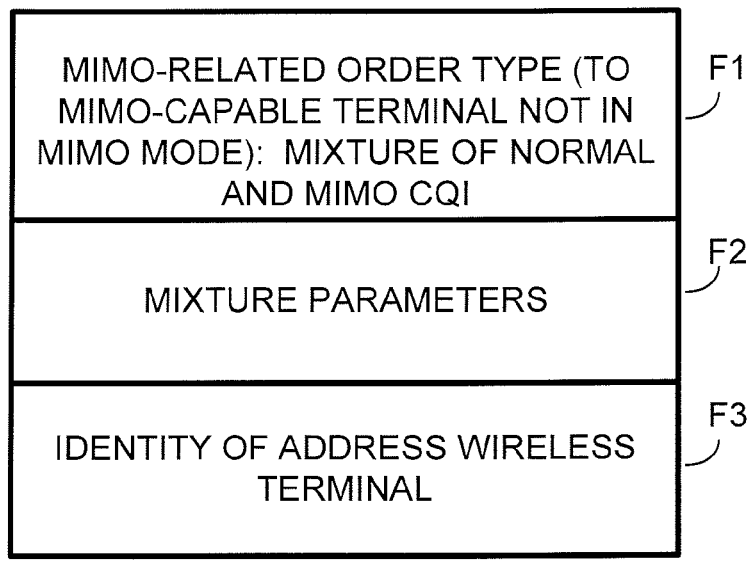
FIG. 10B is a diagrammatic view of an example format of an appropriate order for the sixth example implementation.

FIG. 10A and FIG. 10B illustrate a sixth example implementation of the embodiment and mode of FIG. 4. In corresponding fashion as the preceding figures, FIG. 10A shows example, representative acts of steps of the implementation; FIG. 10B illustrates an example format of an appropriate order for inclusion in the high-speed shared control channel (HS-SCCH).

A purpose of the implementation of FIG. 10A and FIG. 10B is to request a mixture of "normal" channel quality indication (CQI) reports and MIMO channel quality indication (CQI) reports when the wireless terminal is not configured in the MIMO mode. As indicated previously, a "normal" CQI is used for wireless terminals not configured in multiple-input-multiple-output-(MIMO) mode. For example, the network can instruct the wireless terminal that every J number out of every K number of CQIs it reports should be a type "normal" channel quality indication (CQI), while the remainder of the reports should be MIMO channel quality indication (CQI) reports. Whether the remainder (K-J number) of MIMO channel reports should be A type or B type can also specified, or alternatively a combination of A type and B type of CQIs can be used to constitute the remainder (K-J number), as well (if desired) a ratio of A type to B type of MIMO channel reports.

Act 10-1 of FIG. 10A comprises generating a MIMO-related order and configuring the MIMO-related order to request a mixture of normal channel quality indications (CQI) and MIMO channel quality indications (CQIs). Act 10-2 of FIG. 10A comprises the wireless terminal, in response to the order of act 10-1, providing the requested mixture of normal channel quality indications (CQI) and MIMO channel quality indications (CQIs).

FIG. 10B illustrates an example format of the MIMO-related order of act 10-1, also in an implementation wherein the order of act 10-1 has substantially the same field patterns as described 3GPP TS 25.212 V8.3.0 (20010-09), section 4.6C. Field F1 of the MIMO-related order of act 10-1 contains a value that is different from the conventional order type values. In particular, field F1 of the MIMO-related order of act 9-1 contains a value that signifies that the purpose of the order is to request that the wireless terminal provide, when the wireless terminal is not operating in the MIMO mode, a mixture of normal channel quality indications (CQIs) and MIMO channel quality indications (CQIs). Field F2 of the MIMO-related order of act 10-1 can contain a parameter which may further define the mixture, e.g., a value that specifies that every J number out of every K number of CQIs it reports should be a type "normal" channel quality indication (CQI), while the remainder of the reports should be MIMO channel quality indication (CQI) reports. Optionally the Field F2 of the MIMO-related order of act 10-1 can also specify whether the MIMO channel quality indication (CQI) reports are to be type A, type B, or a combination of both (and if so, a ratio, e.g., of type A to type B). Field F3 of the MIMO-related order of act 10-1 specifies which particular one of plural possible wireless terminals is addressed (e.g., to which wireless terminal the HS-SCCH MIMO-related CQI order applies).

Figure 11A:
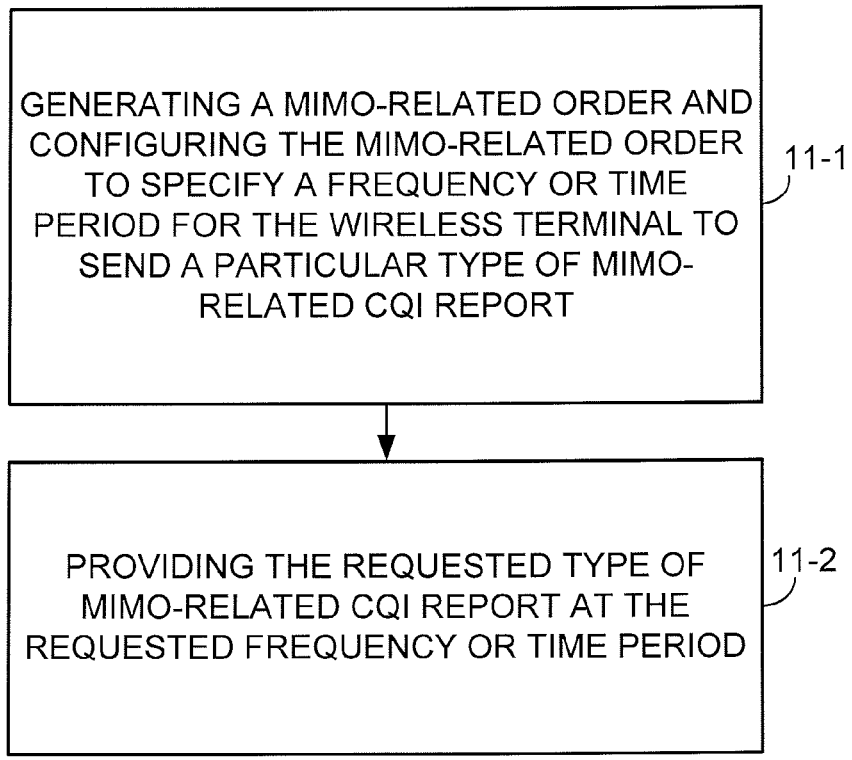
FIG. 11A a flowchart showing example basic or representative acts or steps performed in conjunction with a seventh example implementation of FIG. 4.
Figure 11B:
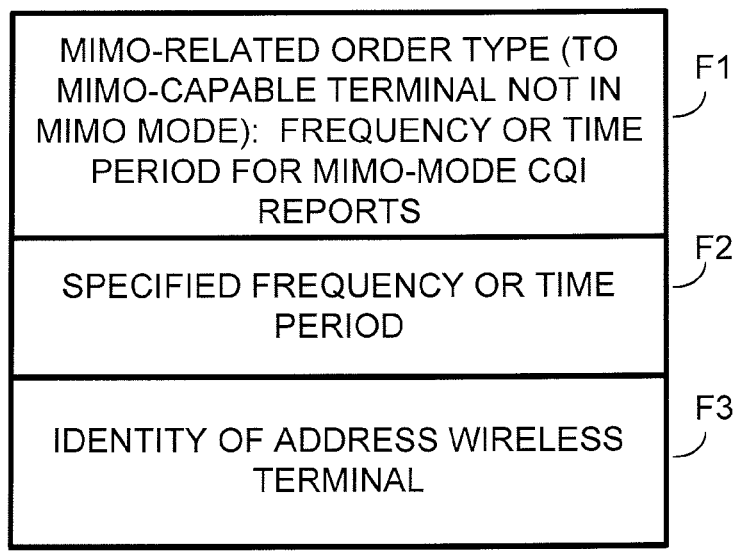
FIG. 11B is a diagrammatic view of an example format of an appropriate order for the seventh example implementation.

FIG. 11A and FIG. 11B illustrate a seventh example implementation of the embodiment and mode of FIG. 4. In corresponding fashion as the preceding figures, FIG. 11A shows example, representative acts of steps of the implementation; FIG. 11B illustrates an example format of an appropriate order for inclusion in the high-speed shared control channel (HS-SCCH).

Act 11-1 of FIG. 11A comprises generating a MIMO-related order and configuring the MIMO-related order to specify a frequency or time period may for the wireless terminal to send a particular type of MIMO-related CQI report (or, conversely, a non-MIMO related CQI report). For example, a frequency or time period may be set for the wireless terminal to send a type A MIMO-related CQI report or a type B MIMO-related CQI report. Act 11-2 of FIG. 11A comprises the wireless terminal, in response to the order of act 11-1, providing the requested type of MIMO-related CQI report at the requested frequency or time period.

FIG. 11B illustrates an example format of the MIMO-related order of act 11-1, also in an implementation wherein the order of act 11-1 has substantially the same field patterns as described 3GPP TS 25.212 V8.3.0 (20010-09), section 4.6C. Field F1 of the MIMO-related order of act 11-1 contains a value that is different from the conventional order type values. In particular, field F1 of the MIMO-related order of act 9-1 contains a value that specifies a frequency or time period for the wireless terminal to send a particular type of MIMO-related CQI report. Field F2 of the MIMO-related order of act 11-1 specifies that particular frequency or time period at/for which the MIMO-related CQI reports are requested. Field F3 of the MIMO-related order of act 11-1 specifies which particular one of plural possible wireless terminals is addressed (e.g., to which wireless terminal the HS-SCCH MIMO-related CQI order applies).

Figure 12A:
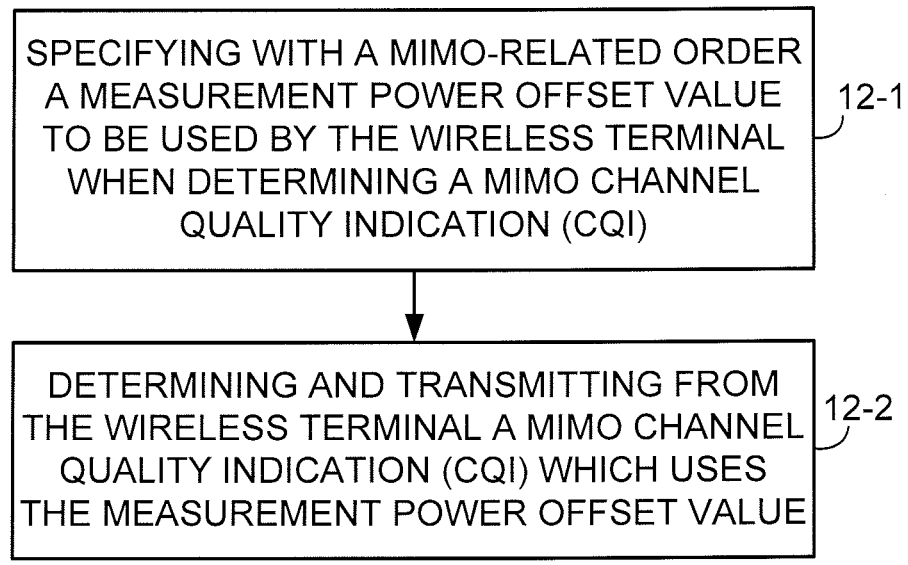
FIG. 12A a flowchart showing example basic or representative acts or steps performed in conjunction with an eighth example implementation of FIG. 4.
Figure 12B:
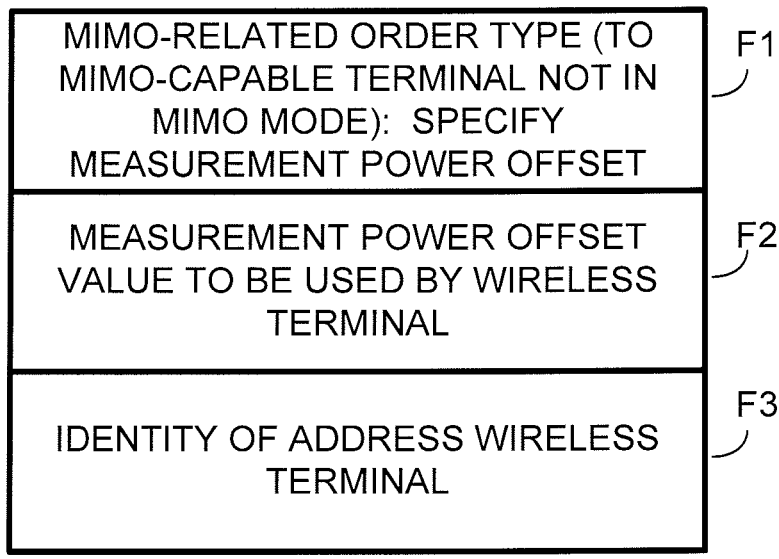
FIG. 12B is a diagrammatic view of an example format of an appropriate order for the seventh example implementation.

FIG. 12A and FIG. 12B illustrate an eighth example implementation of the embodiment and mode of FIG. 4. In corresponding fashion as the preceding figures, FIG. 12A shows example, representative acts of steps of the implementation; FIG. 12B illustrates an example format of an appropriate order for inclusion in the high-speed shared control channel (HS-SCCH).

A parameter known as the measurement power offset ($\Gamma$) is typically expressed as a difference in power levels of the common pilot channel (CPICH) and the HS-DSCH channel. A wireless terminal assumes this measurement power offset ($\Gamma$) value to be the power level when transmitting the HS-DSCH, and therefore uses this parameter in its HSDPA CQI measurement algorithm. Typically, the measurement power offset is set by higher layer signaling, as described for example in TS 25.214 v7, Physical layer procedures (FDD), the contents of which are incorporated by reference. This means that the same power offset is used over a rather long time because the higher layer signaling is, in general, rather slow. For non-MIMO wireless terminals, this is not a large problem since the network can scale the reported CQI value in accordance with the offset depending on the actual power level of the HS-DSCH. But for MIMO-mode wireless terminals such scaling is usually not possible because the interference affecting the CQI depends on the allocated code and power resources. Thus, if the measurement power offset ($\Gamma$) does not represent the actual power, the MIMO CQI as returned by the MIMO-mode wireless terminal in a CQI report will not reflect the true quality of the channel.

Act 12-1 of FIG. 12A comprises specifying (with a MIMO-related order) a measurement power offset value to be used by the wireless terminal when determining a MIMO channel quality indication (CQI). Act 12-2 of FIG. 12A comprises the wireless terminal, in accordance with the order, determining and transmitting from the wireless terminal a MIMO channel quality indication (CQI) which uses the measurement power offset value.

FIG. 12B illustrates an example format of the MIMO-related order of act 12-1, also in an implementation wherein the order of act 12-1 has substantially the same field patterns as described 3GPP TS 25.212 V8.3.0 (20010-09), section 4.6C. Field F1 of the MIMO-related order of act 12-1 contains a value that is different from the conventional order type values. In particular, field F1 of the MIMO-related order of act 12-1 contains a value that signifies that the purpose of the order is to specify or change a measurement power offset value to be used by the wireless terminal when determining a MIMO channel quality indication (CQI). Field F2 of the MIMO-related order of act 12-1 specifies that particular value of the measurement power offset that is to be used by the wireless terminal as a result of the order of act 12-1. Field F3 of the MIMO-related order of act 12-1 specifies which particular one of plural possible wireless terminals is addressed (e.g., to which wireless terminal the HS-SCCH MIMO-related CQI order applies).

Thus, in the non-limiting example embodiment of FIG. 12A and FIG. 12B, the measurement power offset ($\Gamma$) is changed using HS-SCCH orders. Changing the measurement power offset ($\Gamma$) by the HS-SCCH orders generally results in a faster change in measurement power offset than would otherwise occur by higher layer signaling. Consequently, in at least some instances the measurement power offset ($\Gamma$) as utilized by the wireless terminal in its CQI will better represent the actual power, with the result that the MIMO CQI as returned by the MIMO-mode wireless terminal in a CQI report will better reflect the true quality of the channel. Thus, changing the measurement power offset $\Gamma$ using an HS-SCCH order can provide a benefit to the network in the form of more accurate CQI reports from MIMO users.

Figure 13A:
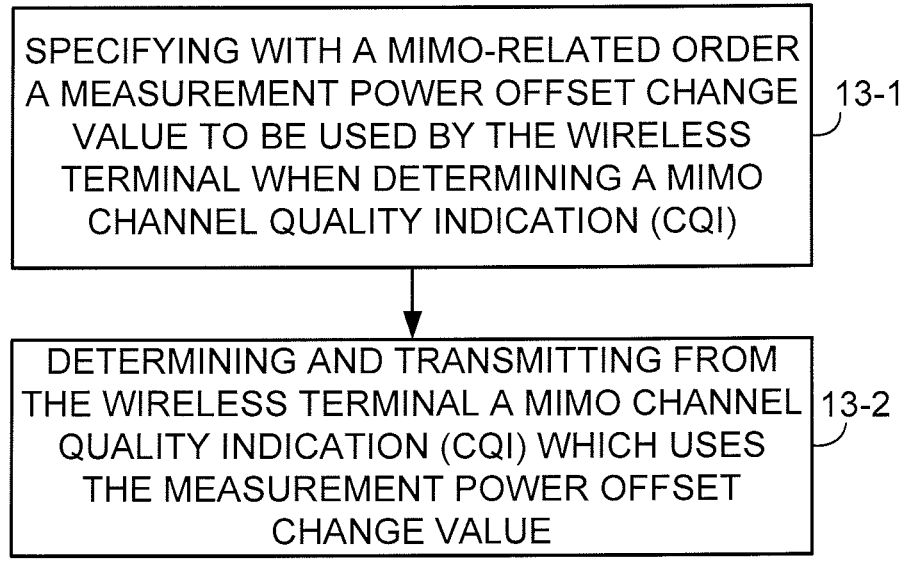
FIG. 13A a flowchart showing example basic or representative acts or steps performed in conjunction with a ninth example implementation of FIG. 4.
Figure 13B:
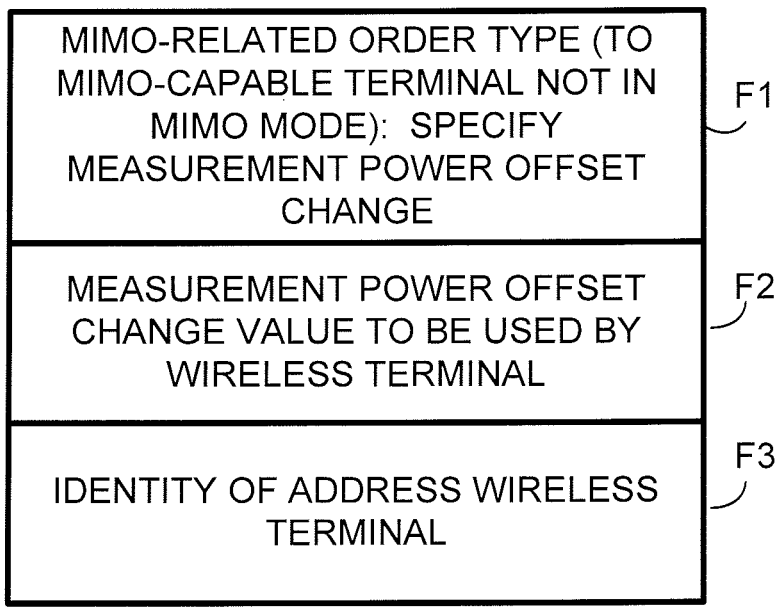
FIG. 13B is a diagrammatic view of an example format of an appropriate order for the eighth example implementation.

FIG. 13A and FIG. 13B illustrate a ninth example implementation of the embodiment and mode of FIG. 4. In corresponding fashion as the preceding figures, FIG. 13A shows example, representative acts of steps of the implementation; FIG. 13B illustrates an example format of an appropriate order for inclusion in the high-speed shared control channel (HS-SCCH).

Act 13-1 of FIG. 13A comprises specifying (with a MIMO-related order) a measurement power offset change value to be used by the wireless terminal when determining a MIMO channel quality indication (CQI). The measurement power offset value of the embodiment of FIG. 12A and FIG. 12B can be an absolute value (which is not dependent upon a previous value of the measurement power offset value). By contrast, the measurement power offset change value has a value which reflects how the measurement power offset value is to be adjusted or changed relative to a previous or other value (e.g., a measurement power offset value which has previously been signaled over a higher layer). In other words the measurement power offset change value is a "delta" which reflects a magnitude of change relative to a previously used or signaled measurement power offset value.

Act 13-2 of FIG. 13A comprises the wireless terminal, in accordance with the order of act 13-1, determining and transmitting from the wireless terminal a MIMO channel quality indication (CQI) which uses the measurement power offset value. In determining the MIMO channel quality indication (CQI), the wireless terminal adjusts the previously used or previously signaled measurement power offset value using the measurement power offset change value, and thereby deduces the new measurement power offset value to be used for determining the MIMO channel quality indication (CQI).

FIG. 13B illustrates an example format of the MIMO-related order of act 13-1, also in an implementation wherein the order of act 13-1 has substantially the same field patterns as described 3GPP TS 25.212 V8.3.0 (20010-09), section 4.6C. Field F1 of the MIMO-related order of act 13-1 contains a value that is different from the conventional order type values. In particular, field F1 of the MIMO-related order of act 13-1 contains a value that signifies that the purpose of the order is to specify or change a measurement power offset change value to be used by the wireless terminal when determining a MIMO channel quality indication (CQI). Field F2 of the MIMO-related order of act 13-1 specifies that particular value of the measurement power offset change that is to be used by the wireless terminal as a result of the order of act 13-1. Field F3 of the MIMO-related order of act 13-1 specifies which particular one of plural possible wireless terminals is addressed (e.g., to which wireless terminal the HS-SCCH MIMO-related CQI order applies).

Figure 14:
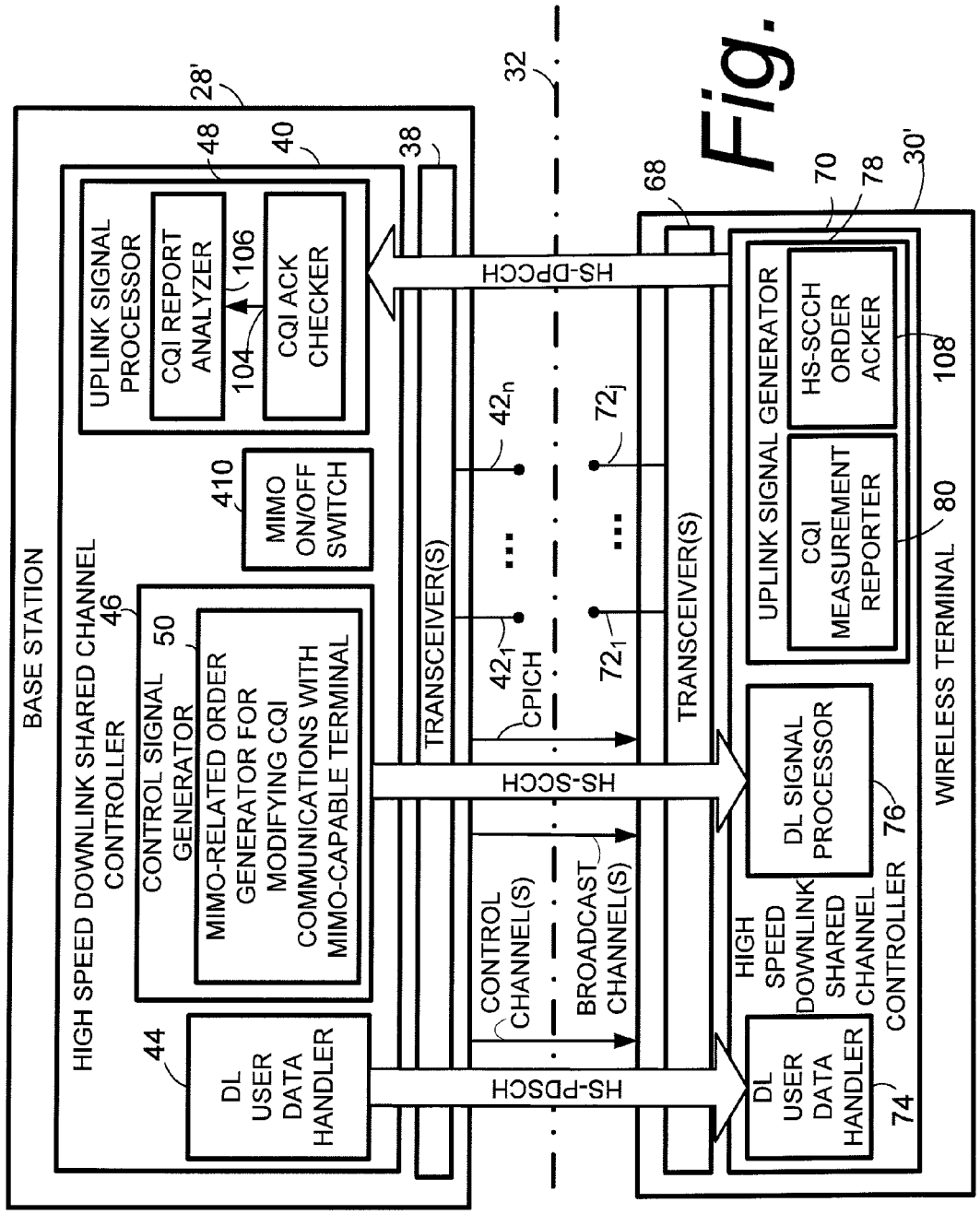
FIG. 14 is a diagrammatic view of at least a portion of an example a radio access network comprising an example embodiment base station, the base station comprising a MIMO-related order generator which modifies CQI communications, and wherein an acknowledgement of the order is provided by a wireless terminal.

FIG. 14 resembles FIG. 1 in showing at least a portion of a radio access network (RAN), again particularly illustrating an example base station 28' which communicates with a wireless terminal 30' across an air interface 32. The base station 28' essentially resembles base station 28 of FIG. 1, but further includes in its signal processor 48 both an order acknowledgement checker 104 and CQI report analyzer 106. Similarly, wireless terminal 30' essentially resembles wireless terminal 30 of FIG. 1, but further includes order acknowledger 108 which serves to determine whether an order included in the downlink signal channel has been acknowledged.

The embodiment of FIG. 15 tends to reduce or avoid errors by providing an acknowledgement by wireless terminal 30' of the MIMO-related order affecting CQI which is included in the high speed downlink signaling channel (e.g., in HS-SCCH). For example, when wireless terminal 30' receives an HS-SCCH order 80 for a MIMO CQI, the wireless terminal 30' responds with an acknowledgment message (e.g., "ACK") as illustrated by message 110 in FIG. 15. When the base station 28' receives this ACK message 110, it knows that the wireless terminal 30' has received the order correctly, and that the next reported CQI will be a type A or type B MIMO CQI. Without this acknowledgment, the system needs to determine what type of CQI is sent, i.e., whether it is a normal or MIMO type CQI.

Thus, in the example embodiment and mode of FIG. 14 and FIG. 15, the method further comprises the wireless terminal sending an acknowledgement of the MIMO related order to the base station. In particular, the order acknowledger 98 of the uplink signal generator 78 includes an acknowledgement of the MIMO-related order in the uplink control signal, e.g., HS-DPCCH. At base station 28' the uplink control signal which includes acknowledgement of the MIMO-related order is first processed by CQI ack checker 104 of base station uplink signal processor 48, which checks to see if the uplink control signal actually includes the expected acknowledgement of the MIMO related order. If so, the ensuing CQI report received on the uplink control channel from the wireless terminal 30' can be treated as the expected MIMO-type CQI report. In other words, if the wireless terminal 30 acknowledges that it has received the MIMO related order, the base station 28' can assume that the wireless terminal 30' is using the expected CQI format, and thus the base station 28' does not need to try to detect what CQI format the wireless terminal 30' is using. Preferably the base station 28' should only skip the CQI format detection if it actually receives the acknowledgement from the wireless terminal 30' (since there is a possibility that an acknowledgement could get lost en route from the wireless terminal 30' to the base station 28'.

The order acknowledgement aspect described in conjunction with FIG. 14 and FIG. 15 can also be utilized in conjunction with any one or more of the preceding embodiments, e.g., the embodiments and modes of the preceding figures or other embodiments or modes encompassed hereby.

In a Continuous Packet Connectivity (CPC) context, conventional HS-SCCH orders are defined in WCDMA for (de)activation of Discontinuous Reception (DRX) and/or Discontinuous Transmission (DTX). The order generator 50 of the technology disclosed herein advantageously employs HS-SCCH orders also to instruct a MIMO-capable wireless terminal to modify the CQI communications between the base station and the wireless terminal, e.g., in one example embodiment and implementation to send a MIMO type (e.g., a type A or type B) channel quality indication (CQI) report even if that wireless terminal is not currently configured to operate in MIMO mode.

In some example embodiments and modes, when the wireless terminal detects a predetermined bit sequence or the like in a first part of an HS-SCCH message, the wireless terminal then interprets a second part of the HS-SCCH message as CQI reporting information (rather than information for data transmissions such as HARQ-related information). The second part of the HS-SCCH control channel can contain a bit sequence that indicates that the wireless terminal should replace the "normal" channel quality indication (CQI) report with a MIMO channel quality indication (CQI) report. Because many spare combinations are provided in part 2 of the HS-SCCH, bit sequences representing a type A or type B CQI report may be defined for and included in one or more of those spare combinations.

The technology described here provides an excellent way to detect when it is appropriate and desirable to switch on MIMO CQI reporting in a wireless terminal which saves uplink (UL) and downlink (DL) overhead signaling and improves system performance. Without this ability to order a wireless terminal to send a MIMO CQI, the system has to "blindly" switch a wireless terminal between MIMO and non-MIMO modes. Such blind switching causes unnecessary overhead if the wireless terminal is in MIMO mode but only receives one transport block per TTI (single stream). On the other hand, if the wireless terminal is not switched into MIMO mode when the wireless terminal actually can receive dual streams, the MIMO gain is lost.

An additional advantage with the an example embodiment described above is that the reporting ratio between type A and type B CQI reports can be changed depending on the environment because the ratio N/M is set by higher layer signaling. However, it may be difficult for the network to determine the "optimal" ratio at a specific moment because the ratio depends on the current radio conditions. Also, signaling from the network may not be fast enough to follow rapidly varying radio channel conditions. Changing the measurement power offset $\Gamma$ using HS-SCCH orders is much faster than changing the measurement power offset $\Gamma$ with higher layer signaling, since a more accurate CQI reports can be sent if the measurement power offset $\Gamma$ can be changed faster.

In one example implementation, the radio communications between the RAN and UE are based on WCDMA and a HS-DSCH is used to transmission data to the UE, the channel quality report includes a channel quality indicator (CQI), the radio control channel is a HS-SCCH, and the message is an existing control message. The existing control message is an HS-SCCH order, and wherein the HS-SCCH order includes a first field indicating a CQI report and a second field indicating whether the CQI should be normal, type A, or type B.

Although not illustrated as such in FIG. 1 and other drawings, it will be understood that the radio access network (RAN) can comprise other base stations, as well as one or more radio network controller (RNC) nodes which control one or more of the base stations under their respective jurisdictions. Further, the radio access network is typically connected to one or more unillustrated external (e.g., core) networks. The external networks may comprise, for example, connection-oriented networks such as the Public Switched Telephone Network (PSTN) and/or the Integrated Services Digital Network (ISDN), and/or connectionless external core network such as (for example) the Internet. One or more of the external networks have unillustrated serving nodes such as, e.g., a Mobile Switching Center (MSC) node and a Serving General Packet Radio Service (GPRS) Support node (SGSN) working in conjunction with a Gateway GRPS Support Node (GGSN).

It will further be appreciated that example embodiments of the base stations and wireless terminals illustrated and described herein can and typically do have many other constituent elements, units and/or functionalities. Only those helpful for providing information relating to the technology disclosed herein have been specifically described and/or illustrated.

Wireless terminal 30 can be known by different names, such as mobile terminal, mobile station or MS, user equipment unit, handset, or remote unit, for example. Each wireless terminal may be any of myriad devices or appliances, such as mobile phones, mobile laptops, pagers, personal digital assistants or other comparable mobile devices, SIP phones, stationary computers and laptops equipped with a real-time application, such as Microsoft netmeeting, Push-to-talk client etc. Preferably, at least for a UTRAN implementation of the radio access network (RAN), radio access is based upon Wideband, Code Division Multiple Access (WCDMA) with individual radio channels allocated using CDMA spreading codes. Of course, other access methods may be employed.

The high speed downlink shared channel controller 40 and/or one or more of its constituent functionalities or units such as downlink user data handler 44, control signal generator 46, uplink signal processor 48; MIMO ON/OFF switch 49, and MIMO-related order generator 50 can be realized by a controller or processor as those terms are herein expansively elaborated. Similarly, terminal high speed downlink shared channel controller 70 and/or one or more of its constituent functionalities or units such as downlink user data handler 74; downlink control signal processor 76; and uplink signal generator 78 can be realized by a controller or processor as those terms are herein expansively elaborated.

Although the description above contains many specificities, these should not be construed as limiting the scope of the invention but as merely providing illustrations of some of the presently preferred embodiments. The scope of the present invention fully encompasses other embodiments which may become obvious to those skilled in the art, and is not to be unduly limited. Reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein. Moreover, it is not necessary for a device or method to address each and every problem sought to be solved by the present invention, for it to be encompassed hereby.

What is claimed is:

1. A network node operative to communicate over a radio interface with a wireless terminal having multiple-input multiple-output (MIMO) capabilities, comprising:
a network node configured to generate a MIMO-related order for inclusion in the control signaling on the high speed downlink shared channel, the MIMO-related order being configured to modify channel quality indication (CQI) communications between the wireless terminal and the network node so as to cause the wireless terminal to transmit to the network node a MIMO CQI including preferred precoder weights and quantized SNR when the wireless terminal is not operating in a MIMO mode.

2. The network node of claim 1, further comprising:
a transceiver configured to provide either MIMO transmissions or non-MIMO transmissions as needed over the radio interface to the wireless terminal;
a high speed downlink shared channel controller configured to schedule transmission of user data and control signaling over the radio interface on a high speed downlink shared channel;
a control signal generator configured to generate the MIMO-related order for inclusion in the control signaling.

3. The network node of claim 1, wherein the MIMO-related order is configured to request that the wireless terminal provide a MIMO type A or MIMO type B channel quality indication CQI including preferred precoder weights and quantized SNR when the wireless terminal is not operating in a MIMO mode.

4. The network node of claim 1, wherein the MIMO-related order is configured to request that the wireless terminal provide a single MIMO channel quality indication CQI including preferred precoder weights and quantized SNR when the wireless terminal is not operating in a MIMO mode.

5. The network node of claim 1, wherein the MIMO-related order is configured to request that the wireless terminal provide, when the wireless terminal is not operating in the MIMO mode, a same pattern of MIMO type A and MIMO type B channel quality indications CQIs including preferred precoder weights and quantized SNR as was previously provided when the wireless terminal was operating in a MIMO mode.

6. The network node of claim 1, wherein the MIMO-related order is configured to request that the wireless terminal provide, when the wireless terminal is not operating in a MIMO mode, a specific ratio of MIMO type A and MIMO type B channel quality indications including preferred precoder weights and quantized SNR.

7. The network node of claim 1, wherein the MIMO-related order is configured to prescribe a pattern of MIMO type A and MIMO type B channel quality indications CQIs including preferred precoder weights and quantized SNR when the wireless terminal is not operating in a MIMO mode.

8. The network node of claim 1, wherein the MIMO-related order is configured to request that the wireless terminal provide, when the wireless terminal is not operating in a MIMO mode, a mixture of normal channel quality indications and MIMO channel quality indications including preferred precoder weights and quantized SNR.

9. The network node of claim 1, wherein the MIMO-related order is configured to request that the wireless terminal replace a non-MIMO channel quality indication CQI with a MIMO channel quality indication CQI including preferred precoder weights and quantized SNR when the wireless terminal is not operating in a MIMO mode.

10. The network node of claim 1, wherein the MIMO-related order specifies a measurement power offset value to be used by the wireless terminal when determining a MIMO channel quality indication CQI including preferred precoder weights and quantized SNR.

11. The network node of claim 10, wherein the MIMO-related order specifies one of (1) a new measurement power offset value to replace a previous measurement power offset value; and (2) a measurement power offset change value to be used to modify a measurement power offset change signaled over a higher layer.

12. A wireless terminal operative to communicate over a radio interface with a network node, the wireless terminal comprising:
a wireless terminal configured to interpret a MIMO-related order included in control signaling on the high speed downlink shared channel as requesting modification of channel quality indication CQI communications between the wireless terminal and the network node in view of MIMO capabilities of the wireless terminal and further configured to report a MIMO channel quality indication (CQI) including preferred precoder weights and quantized SNR, when the wireless terminal is not operating in a MIMO mode, in accordance with the MIMO-related order.

13. The wireless terminal of claim 12, further comprising:
a transceiver configured to provide either MIMO receptions or non-MIMO receptions as needed over the radio interface from the network node;
a high speed downlink shared channel controller configured to interpret the MIMO-related order included in control signaling on the high speed downlink shared channel; and
a channel quality indication CQI reporter configured to report the MIMO channel quality indication CQI including preferred precoder weights and quantized SNR in accordance with the MIMO-related order.

14. The wireless terminal of claim 13, wherein the high speed downlink shared channel controller of the wireless terminal is configured to interpret the MIMO-related order as requesting that the wireless terminal provide a MIMO channel quality indication CQI including preferred precoder weights and quantized SNR when the wireless terminal is not operating in a MIMO mode, and wherein the channel quality indication CQI reporter is configured to accordingly provide the MIMO channel quality indication CQI including preferred precoder weights and quantized SNR when the wireless terminal is not operating in the MIMO mode.

15. The wireless terminal of claim 14, wherein the high speed downlink shared channel controller of the wireless terminal is further configured, upon receiving the MIMO-related order, to provide an acknowledgement signal to the network node configured to enable the network node to automatically process a channel quality indication CQI received from the wireless terminal without having to detect what CQI format the wireless terminal is using for the channel quality indication CQI.

16. The wireless terminal of claim 14, wherein the high speed downlink shared channel controller of the wireless terminal is configured to interpret the MIMO-related order as requesting that the wireless terminal provide a MIMO type A or MIMO type B channel quality indication CQI including preferred precoder weights and quantized SNR when the wireless terminal is not operating in the MIMO mode, and wherein accordingly the channel quality indication CQI reporter is configured to provide either the MIMO type A or the MIMO type B channel quality indication including preferred precoder weights and quantized SNR when the wireless terminal is not operating in the MIMO mode.

17. The wireless terminal of claim 14, wherein the high speed downlink shared channel controller of the wireless terminal is configured to interpret the MIMO-related order as requesting that the wireless terminal provide a single MIMO channel quality indication CQI including preferred precoder weights and quantized SNR when the wireless terminal is not operating in the MIMO mode, and wherein the channel quality indication CQI reporter is configured to accordingly provide the single MIMO channel quality indication CQI including preferred precoder weights and quantized SNR when the wireless terminal is not operating in the MIMO mode.

18. The wireless terminal of claim 14, wherein the high speed downlink shared channel controller of the wireless terminal is configured to interpret the MIMO-related order as requesting that the wireless terminal provide, when the wireless terminal is not operating in the MIMO mode, a same pattern of MIMO type A and MIMO type B channel quality indications CQIs including preferred precoder weights and quantized SNR as was previously provided when the wireless terminal was operating in the MIMO mode, and wherein the channel quality indication CQI reporter is configured to accordingly provide the same pattern of MIMO type A and MIMO type B channel quality indications CQIs including preferred precoder weights and quantized SNR when the wireless terminal is not operating in the MIMO mode.

19. The wireless terminal of claim 14, wherein the high speed downlink shared channel controller of the wireless terminal is configured to interpret the MIMO-related order as requesting that the wireless terminal provide, when the wireless terminal is not operating in the MIMO mode, a specific ratio of MIMO type A and MIMO type B channel quality indications including preferred precoder weights and quantized SNR.

20. The wireless terminal of claim 14, wherein the high speed downlink shared channel controller of the wireless terminal is configured to interpret the MIMO-related order as requesting that the wireless terminal provide a prescribed pattern of MIMO type A and MIMO type B channel quality indications CQIs including preferred precoder weights and quantized SNR when the wireless terminal is not operating in the MIMO mode, and wherein the channel quality indication CQI reporter is configured to accordingly provide the prescribed pattern of MIMO type A and MIMO type B channel quality indications CQIs including preferred precoder weights and quantized SNR when the wireless terminal is not operating in the MIMO mode.

21. The wireless terminal of claim 14, wherein the high speed downlink shared channel controller of the wireless terminal is configured to interpret the MIMO-related order as requesting that the wireless terminal provide, when the wireless terminal is not operating in the MIMO mode, a mixture of normal channel quality indications and MIMO channel quality indications including preferred precoder weights and quantized SNR.

22. The wireless terminal of claim 14, wherein the high speed downlink shared channel controller of the wireless terminal is configured to interpret the MIMO-related order as requesting that the wireless terminal replace a non-MIMO channel quality indication CQI with a MIMO channel quality indication CQI including preferred precoder weights and quantized SNR when the wireless terminal is not operating in the MIMO mode; and wherein the channel quality indication CQI reporter is configured to accordingly replace a non-MIMO channel quality indication CQI with a MIMO channel quality indication CQI including preferred precoder weights and quantized SNR when the wireless terminal is not operating in the MIMO mode.

23. The wireless terminal of claim 14, wherein the high speed downlink shared channel controller of the wireless terminal is configured to interpret the MIMO-related order as including a measurement power offset value to be used by the wireless terminal when determining a MIMO channel quality indication CQI including preferred precoder weights and quantized SNR, and wherein the channel quality indication CQI reporter is configured to accordingly use the measurement power offset value to be used by the wireless terminal when determining a MIMO channel quality indication CQI including preferred precoder weights and quantized SNR.

24. The wireless terminal of claim 23, wherein the high speed downlink shared channel controller of the wireless terminal is configured to interpret the MIMO-related order as specifying one of (1) a new measurement power offset value to replace a previous measurement power offset value; and (2) a measurement power offset change value to be used to modify a measurement power offset change signaled over a higher layer.

25. A method for use in a communications network that comprises a network node operative to communicate over a radio interface with a wireless terminal, both the network node and the wireless terminal having multiple-input multiple-output (MIMO) capabilities, comprising:
generating a MIMO-related order for inclusion in control signaling on a high speed downlink shared channel from the network node to the wireless terminal, the MIMO-related order being configured to modify channel quality indication (CQI) communications between the wireless terminal and the network node so as to cause the wireless terminal to transmit to the network node a MIMO CQI including preferred precoder weights and quantized SNR when the wireless terminal is not operating in a MIMO mode; and
providing a channel quality indication CQI report including preferred precoder weights and quantized SNR from the wireless terminal to the network node, when the wireless terminal is not operating in a MIMO mode, in accordance with the order.

26. A method of operating a network node operative to communicate over a radio interface with a wireless terminal, both the network node and the wireless terminal having multiple-input multiple-output (MIMO) capabilities, the method characterized by:
generating a MIMO-related order for inclusion in control signaling on a high speed downlink shared channel from the network node to the wireless terminal, the MIMO-related order being configured to modify channel quality indication (CQI) communications between the wireless terminal and the network node so as to cause the wireless terminal to transmit to the network node a MIMO CQI including preferred precoder weights and quantized SNR when the wireless terminal is not operating in a MIMO mode; and
transmitting the MIMO-related order over the radio interface to the wireless terminal.

27. The method of claim 26, wherein the method further comprises:
receiving an acknowledgement of the MIMO-related order from the wireless terminal, and thereafter
automatically processing a channel quality indication CQI received from the wireless terminal without having to detect what CQI format the wireless terminal is using for the channel quality indication CQI.

28. The method of claim 26, wherein the MIMO-related order is configured to request that the wireless terminal provide a MIMO type A or MIMO type B channel quality indication CQI including preferred precoder weights and quantized SNR when the wireless terminal is not operating in a MIMO mode.

29. The method of claim 26, wherein the MIMO-related order is configured to request that the wireless terminal provide a single MIMO channel quality indication CQI including preferred precoder weights and quantized SNR when the wireless terminal is not operating in a MIMO mode.

30. The method of claim 26, wherein the MIMO-related order is configured to request that the wireless terminal provide, when the wireless terminal is not operating in a MIMO mode, a same pattern of MIMO type A and MIMO type B channel quality indications CQIs including preferred precoder weights and quantized SNR as was previously provided when the wireless terminal was operating in the MIMO mode.

31. The method of claim 26, wherein the MIMO-related order is configured to request that the wireless terminal provide, when the wireless terminal is not operating in a MIMO mode, a specific ratio or MIMO type A and MIMO type B channel quality indications including preferred precoder weights and quantized SNR.

32. The method of claim 26, wherein the MIMO-related order is configured to prescribe a pattern of MIMO type A and MIMO type B channel quality indications CQIs including preferred precoder weights and quantized SNR when the wireless terminal is not operating in a MIMO mode.

33. The method of claim 26, wherein the MIMO-related order is configured to request that the wireless terminal provide, when the wireless terminal is not operating in a MIMO mode, a mixture of normal channel quality indications and MIMO channel quality indications including preferred precoder weights and quantized SNR.

34. The method of claim 26, wherein the MIMO-related order is configured to request that the wireless terminal replace a non-MIMO channel quality indication CQI with a MIMO channel quality indication CQI including preferred precoder weights and quantized SNR when the wireless terminal is not operating in a MIMO mode.

35. The method of claim 26, wherein the MIMO-related order is configured to specify a measurement power offset value to be used by the wireless terminal when determining a MIMO channel quality indication CQI including preferred precoder weights and quantized SNR.

36. The method of claim 35, wherein the MIMO-related order is configured to specify one of (1) a new measurement power offset value to replace a previous measurement power offset value; and (2) a measurement power offset change value to be used to modify a measurement power offset change signaled over a higher layer.

37. A method of operating a wireless terminal operative to communicate over a radio interface with a network node, both the network node and the wireless terminal having multiple-input multiple-output (MIMO) capabilities, comprising:
receiving a MIMO-related order include in control signaling on a high speed downlink shared channel from the network node and interpreting the MIMO-related order as being configured to modify channel quality indication (CQI) communications between the wireless terminal and the network node so as to cause the wireless terminal to transmit to the network node a MIMO CQI including preferred precoder weights and quantized SNR when the wireless terminal is not operating in a MIMO mode; and
providing a channel quality indication CQI report including preferred precoder weights and quantized SNR from the wireless terminal to the network node, when the wireless terminal is not operating in a MIMO model, in accordance with the order.

38. The method of claim 37, wherein the method further comprises:
sending an acknowledgement of the MIMO-related order to the network node, such that the network node may thereafter automatically process a channel quality indication CQI sent from the wireless terminal without having to detect what CQI format the wireless terminal is using for the channel quality indication CQI.

39. The method of claim 37, wherein the MIMO-related order is configured to request that the wireless terminal provide a MIMO type A or MIMO type B channel quality indication CQI including preferred precoder weights and quantized SNR when the wireless terminal is not operating in a MIMO mode.

40. The method of claim 37, wherein the MIMO-related order is configured to request that the wireless terminal provide a single MIMO channel quality indication CQI including preferred precoder weights and quantized SNR when the wireless terminal is not operating in a MIMO mode.

41. The method of claim 37, wherein the MIMO-related order is configured to request that the wireless terminal provide, when the wireless terminal is not operating in a MIMO mode, a same pattern of MIMO type A and MIMO type B channel quality indications CQIs including preferred precoder weights and quantized SNR as was previously provided when the wireless terminal was operating in the MIMO mode.

42. The method of claim 37, wherein the MIMO-related order is configured to request that the wireless terminal provide, when the wireless terminal is not operating in a MIMO mode, a specific ratio or MIMO type A and MIMO type B channel quality indications including preferred precoder weights and quantized SNR.

43. The method of claim 37, wherein the MIMO-related order is configured to prescribe a pattern of MIMO type A and MIMO type B channel quality indications CQIs including preferred precoder weights and quantized SNR when the wireless terminal is not operating in a MIMO mode.

44. The method of claim 37, wherein the MIMO-related order is configured to request that the wireless terminal provide, when the wireless terminal is not operating in a MIMO mode, a mixture of normal channel quality indications and MIMO channel quality indications including preferred precoder weights and quantized SNR.

45. The method of claim 37, wherein the MIMO-related order is configured to request that the wireless terminal replace a non-MIMO channel quality indication CQI with a MIMO channel quality indication CQI including preferred precoder weights and quantized SNR when the wireless terminal is not operating in a MIMO mode.

46. The method of claim 37, wherein the MIMO-related order is configured to specify a measurement power offset value to be used by the wireless terminal when determining a MIMO channel quality indication CQI including preferred precoder weights and quantized SNR.

47. The method of claim 37, wherein the MIMO-related order is configured to specify one of (1) a new measurement power offset value to replace a previous measurement power offset value; and (2) a measurement power offset change value to be used to modify a measurement power offset change signaled over a higher layer.

\* \* \* \* \*